(12) United States Patent
Lu et al.

(10) Patent No.: US 10,701,597 B2
(45) Date of Patent: Jun. 30, 2020

(54) METHOD AND DEVICE FOR INDICATING USER EQUIPMENT CAPABILITY, USER EQUIPMENT AND BASE STATION

(71) Applicant: Baicells Technologies Co. Ltd., Beijing (CN)

(72) Inventors: Yang Lu, Beijing (CN); Lixin Sun, Beijing (CN); Yingzhe Ding, Beijing (CN)

(73) Assignee: BAICELLS TECHNOLOGIES CO. LTD., Beijing (CN)

(*) Notice: Subject to any disclaimer, the term of this patent is extended or adjusted under 35 U.S.C. 154(b) by 0 days.

(21) Appl. No.: 16/094,762

(22) PCT Filed: Jul. 25, 2017

(86) PCT No.: PCT/CN2017/094346
§ 371 (c)(1),
(2) Date: Oct. 18, 2018

(87) PCT Pub. No.: WO2018/024135
PCT Pub. Date: Feb. 8, 2018

(65) Prior Publication Data
US 2019/0132775 A1    May 2, 2019

(30) Foreign Application Priority Data

Aug. 1, 2016 (CN) .......................... 2016 1 0622639

(51) Int. Cl.
*H04W 8/24* (2009.01)
*H04W 36/00* (2009.01)
(Continued)

(52) U.S. Cl.
CPC ......... *H04W 36/0055* (2013.01); *H04W 8/24* (2013.01); *H04W 24/02* (2013.01); *H04W 48/18* (2013.01); *H04W 36/00* (2013.01)

(58) Field of Classification Search
CPC . H04W 36/0055; H04W 24/02; H04W 36/00; H04W 8/24; H04W 48/18; H04W 36/14
See application file for complete search history.

(56) References Cited

U.S. PATENT DOCUMENTS

2009/0046596 A1*  2/2009  Ewe .................. H04W 36/0033
                                                          370/252
2013/0039232 A1*  2/2013  Kim ....................... H04W 8/22
                                                          370/280
(Continued)

FOREIGN PATENT DOCUMENTS

CN         101272621 A       9/2008
CN         102572973 A       7/2012
(Continued)

OTHER PUBLICATIONS

"European Application Serial No. 17836317.2, Search Report dated Mar. 27, 2019", 11 pgs.
(Continued)

*Primary Examiner* — Un C Cho
*Assistant Examiner* — Kenan Cehic
(74) *Attorney, Agent, or Firm* — Kwan & Olynick LLP

(57) ABSTRACT

A method and a device for indicating a UE capability, a UE and a base station are provided. The method for indicating the UE capability for use in the UE includes steps of: receiving from a base station a request message for acquiring the UE capability; indicating a capability of an MF mode supported by the UE in UE capability information, the capability of the MF mode supported by the UE including a frequency band and/or a function feature of the MF mode supported by the UE; and transmitting the UE capability information to the base station.

16 Claims, 7 Drawing Sheets

(51) Int. Cl.
*H04W 48/18* (2009.01)
*H04W 24/02* (2009.01)

(56) References Cited

U.S. PATENT DOCUMENTS

| | | | |
|---|---|---|---|
| 2014/0112172 A1 | 4/2014 | Vangala et al. | |
| 2017/0164177 A1 | 6/2017 | Wang et al. | |
| 2017/0164273 A1* | 6/2017 | Hayashi | H04W 8/24 |
| 2017/0208454 A1* | 7/2017 | Knisely | H04L 5/0058 |
| 2017/0280382 A1* | 9/2017 | Radulescu | H04W 48/10 |
| 2017/0311316 A1* | 10/2017 | Chendamarai Kannan | H04W 48/16 |
| 2017/0311343 A1* | 10/2017 | Chendamarai Kannan | H04L 5/0055 |
| 2017/0374706 A1* | 12/2017 | Sharma | H04W 76/20 |
| 2018/0041906 A1* | 2/2018 | Jang | H04W 24/10 |
| 2018/0146408 A1* | 5/2018 | Meylan | H04W 36/0088 |
| 2018/0227797 A1* | 8/2018 | Liu | H04W 72/0446 |
| 2018/0376411 A1* | 12/2018 | Rinne | H04W 76/27 |
| 2019/0059046 A1* | 2/2019 | Virtej | H04W 72/0446 |
| 2019/0110170 A1* | 4/2019 | Lu | H04W 4/18 |
| 2019/0124517 A1* | 4/2019 | Sugirtharaj | H04W 8/005 |
| 2019/0132776 A1* | 5/2019 | Markwart | H04W 72/0446 |
| 2019/0215867 A1* | 7/2019 | Cheng | H04W 8/005 |
| 2019/0268910 A1* | 8/2019 | Chen | H04L 5/0064 |

FOREIGN PATENT DOCUMENTS

| | | |
|---|---|---|
| CN | 104869666 A | 8/2015 |
| CN | 107682878 A | 2/2018 |
| JP | 2014527352 A | 10/2014 |
| KR | 20150119798 A | 10/2015 |
| KR | 20160065740 A | 6/2016 |
| WO | 2016003610 A1 | 1/2016 |
| WO | 2016033810 A1 | 3/2016 |
| WO | 2016072497 A1 | 5/2016 |
| WO | 2016002441 A1 | 4/2017 |
| WO | 2018024135 A1 | 2/2018 |

OTHER PUBLICATIONS

"Introducing MulteFire: LTE-like performance with Wi-Fi-like simplicity", Qualcomm, Retrieved from the Internet on Jun. 2, 2017: URL:https://www.qualcomm.com/news/onq/2015/06/11/introducing-multefire-lte-performance-wi-fi-simplicity, Jun. 11, 2015, 6 pgs.

"MulteFire? Technology Progress 1-14 and Benefits, and How It Enables a New Breed of Neutral Hosts", Qualcomm, Retrieved from the Internet on Jun. 2, 2017: URL:https://www.qualconm.com/documents/multefire-technology, May 24, 2016, 26 pgs.

Chambers, David, "MulteFire lights up the 1-14 path for universal wireless service", MulteFire Magazine, Retrieved from the Internet on Mar. 23, 2018: URL:https://www.multefire.org/wp-content/uploads/2016/10/72-multefire-lights-up-thepath-for-universal-wireless-service.pdf, May 31, 2016, 10 pgs.

"Japanese Application Serial No. 2018-535424, Office Action dated May 29, 2019", 7 pgs.

"Korean Application Serial No. 10-2018-7023256, Office Action dated Jun. 27, 2019", 11 pgs.

"Overview of possible LAA impactto RAN2", 3GPP TSG-RAN WG 2#89R2-150188, Retrieved from the Internet on Jan. 30, 2015: www.3gpp.org/ftp/tsg_ran/WG2_RL2/TSGR2_89/Docs/R2-150188.zip, Feb. 2015, 8 pgs.

Myles, Andrew, "A discussion of ED & PD", IEEE 802.19-16/0110r0, Retrieved from the Internet: https://mentor.ieee.org/802.19/dcn/16/19, Jul. 2016, 18 pgs.

"International Application Serial No. PCT/CN2017/094346, Search Report and Written Opinion dated Feb. 14, 2019", 21 pgs.

* cited by examiner

METHOD AND DEVICE FOR INDICATING USER EQUIPMENT CAPABILITY, USER EQUIPMENT AND BASE STATION

CROSS-REFERENCE TO RELATED APPLICATION

This application is the U.S. national phase of PCT Application No. PCT/CN2017/094346 filed on Jul. 25, 2017, which claims a priority of the Chinese patent application No. 201610622639.2 filed before the SIPO on Aug. 1, 2016, both of which are incorporated herein by reference in entirety and for all purposes.

TECHNICAL FIELD

The present disclosure relates to the field of communication technology, in particular to a method and a device for indicating a User Equipment (UE) capability, a UE and a base station.

BACKGROUND

Multe Fire (MF) is a wireless access technology for extending a Long Term Evolution (LTE) system to an unlicensed frequency band, and it is able to use this technology individually in an unlicensed spectrum without the aid of carriers at a licensed frequency band. In order to enable the other devices operated at the unlicensed frequency band (e.g., a Wireless Fidelity (WiFi) device) to fairly occupy a channel at the unlicensed frequency band and prevent these devices from interference with each other, a Listen Before Talk (LBT) mechanism, similar to a WiFi carrier monitoring technology, has been introduced into an MF physical layer. Different from Time Division Duplex (TDD) and Frequency Division Duplex (FDD) of the LTE system, the MF is not provided with a fixed uplink/downlink subframe configuration. A base station determines whether or not a determination of transmitting downlink data is accurate in accordance with the LBT mechanism, and a UE determines whether or not a determination of transmitting uplink data is accurate in accordance with uplink schedule grant from the base station and the LBT mechanism.

Network architecture having two basic access modes is provided by the MF. i.e., a Public Land Mobile Network (PLMN) access mode and a Neutral Host Network (NHN) access mode. The NHN access mode refers to a uniformly-planned, self-organized neutral network newly introduced by the MF, and an MF Radio Access Network (RAN) is connected to a Core Network (CN) of the NHN. The PLMN access mode is a network mode where the MF RAN is connected to a $3^{rd}$ Generation Partnership Project (3GPP) CN of a service provider, and the UE may perform S1 or X2 handover between the MF RAN and a 3GPP RAN in the PLMAN access mode. In addition, there is another hybrid access mode, i.e., the MF RAN is connected to the NHN CN and the 3GPP CN simultaneously.

An original Evolved Universal Terrestrial Radio Access (E-UTRA) radio access technology of the 3GPP merely includes two modes, i.e., TDD and FDD. If the MF is introduced into the 3GPP, the E-UTRA may include three modes, i.e., TDD, FDD and MF. After the MF is introduced into the E-UTRA, any UE having an MF measurement capability may measure an MF cell, and any UE having a handover capability between the MF and the LTE may perform the handover between the MF cell in the PLMAN access mode and a 3GPP cell. However, currently, E-UTRA capability information does not include any indication information related to the MF mode, so it is impossible for the UE to achieve a handover function between the MF cell and the 3GPP cell and any other function related to the MF mode.

SUMMARY

An object of the present disclosure is to provide a method and a device for indicating a UE capability, a UE and a base station, so as to solve the problem in the related art where it is impossible for the UE to achieve the relevant functions in the MF mode because the E-UTRA capability information does not include the capability indication information related to the MF mode.

In one aspect, the present disclosure provides in some embodiments a method for indicating a UE capability for use in a UE, including steps of: receiving from a base station a request message for acquiring the UE capability; indicating a capability of an MF mode supported by the UE in UE capability information, the capability of the MF mode supported by the UE including a frequency band and/or a function feature of the MF mode supported by the UE; and transmitting the UE capability information to the base station.

In a possible embodiment of the present disclosure, the step of indicating the capability of the MF mode supported by the UE in the UE capability information includes: indicating the frequency band of the MF mode supported by the UE in a Radio Frequency (RF) parameter contained in E-UTRA capability information of the UE capability information; and/or indicating the function feature of the MF mode supported by the UE in a Function Group Indicator (FGI) parameter contained in the E-UTRA capability information of the UE capability information, the function feature of the MF mode including a measurement function feature and an intra intra handover function feature of the MF mode.

In a possible embodiment of the present disclosure, the step of indicating the frequency band of the MF mode supported by the UE in the RF parameter contained in the E-UTRA capability information of the UE capability information includes: when a frequency band number used in the MF mode is same as a frequency band number used in a Licensed Assistant Access (LAA) mode, indicating the frequency band of the MF mode supported by the UE in the RF parameter contained in the E-UTRA capability information of the UE capability information using the frequency band number and a network type, the network type including the MF mode and/or the LAA mode; and when a frequency band number used in the MF mode is different from a frequency band number used in the LAA mode, indicating the frequency band of the MF mode supported by the UE in the RF parameter contained in the E-UTRA capability information of the UE capability information using the frequency band number.

In a possible embodiment of the present disclosure, the step of indicating the function feature of the MF mode supported by the UE in the FGI parameter contained in the E-UTRA capability information of the UE capability information includes indicating the intra measurement function feature of the MF mode supported by the UE in the FGI parameter contained in the E-UTRA capability information of the UE capability information using bit information indicating the measurement function feature and/or bit information in a predetermined idle state. The intra measurement function feature of the MF mode includes an intra measurement function feature of the MF mode, a measurement function feature between the MF mode and a TDD mode, or a measurement function feature between the MF mode and an FDD mode.

In a possible embodiment of the present disclosure, the step of indicating the intra measurement function feature of the MF mode supported by the UE in the FGI parameter contained in the E-UTRA capability information of the UE capability information using the bit information indicating the measurement function in feature and/or the bit information in the predetermined idle state includes, in the FGI parameter contained in the E-UTRA capability information of the UE capability information, indicating the intra measurement function feature of the MF mode using first bit information in the predetermined idle state, indicating the measurement function feature between the MF mode and the TDD mode supported by the UE using second bit information in the predetermined idle state, and indicating the measurement function feature between the MF mode and the FDD mode supported by the UE using third bit information in the predetermined idle state.

In a possible embodiment of the present disclosure, the step of indicating the intra measurement function feature of the MF mode supported by the UE in the FGI parameter contained in the E-UTRA capability information of the UE capability information using the bit information indicating the measurement function feature and/or the bit information in the predetermined idle state includes, in the FGI parameter contained in the E-UTRA capability information of the UE capability information, indicating the intra measurement function feature of the MF mode using the bit information indicating the measurement function feature, indicating the measurement function feature between the MF mode and the TDD mode supported by the UE using second bit information in the predetermined idle state, and indicating the measurement function feature between the MF mode and the FDD mode supported by the UE using third bit information in the predetermined idle state.

In a possible embodiment of the present disclosure, the step of indicating the intra measurement function feature of the MF mode supported by the UE in the FGI parameter contained in the E-UTRA capability information of the UE capability information using the bit information indicating the measurement function feature and/or the bit information in the predetermined idle state includes, in the FGI parameter contained in the E-UTRA capability information of the UE capability information, indicating the intra measurement function feature of the MF mode supported by the UE and the measurement function feature of the TDD or FDD mode supported by the UE in the MF mode using the bit information indicating the measurement function feature, and indicating an intra measurement function feature of the MF mode supported by the UE in the TDD or FDD mode using third bit information in the predetermined idle state.

In a possible embodiment of the present disclosure, the step of indicating the intra measurement function feature of the MF mode supported by the UE in the FGI parameter contained in the E-UTRA capability information of the UE capability information using the bit information indicating the measurement function feature and/or the bit information in the predetermined idle state includes, in the FGI parameter contained in the E-UTRA capability information of the UE capability information, indicating the intra measurement function feature of the MF mode supported by the UE using the bit information indicating the measurement function feature, and indicating the measurement function feature between the MF mode and the TDD or FDD mode supported by the UE using third bit information in the predetermined idle state.

In a possible embodiment of the present disclosure, the step of indicating the intra measurement function feature of the MF mode supported by the UE in the FGI parameter contained in the E-UTRA capability information of the UE capability information using the bit information indicating the measurement function feature and/or the bit information in the predetermined idle state includes, in the FGI parameter contained in the E-UTRA capability information of the UE capability information, indicating the intra measurement function feature of the MF mode supported by the UE and the measurement function feature between the MF mode and the TDD mode supported by the UE using the bit information indicating the measurement function feature, and indicating the measurement function feature between the MF mode and the FDD mode supported by the UE using third bit information in the predetermined idle state.

In a possible embodiment of the present disclosure, the step of indicating the intra measurement function feature of the MF mode supported by the UE in the FGI parameter contained in the E-UTRA capability information of the UE capability information using the bit information indicating the measurement function in feature and/or the bit information in the predetermined idle state includes, in the FGI parameter contained in the E-UTRA capability information of the UE capability information, indicating the intra measurement function feature of the MF mode supported by the UE and the measurement function feature between the MF mode and the FDD mode supported by the UE using the bit information indicating the measurement function feature, and indicating the measurement function feature between the MF mode and the TDD mode supported by the UE using third bit information in the predetermined idle state.

In a possible embodiment of the present disclosure, the step of indicating the intra measurement function feature of the MF mode supported by the UE in the FGI parameter contained in the E-UTRA capability information of the UE capability information using the bit information indicating the measurement function feature and/or the bit information in the predetermined idle state includes, in the FGI parameter contained in the E-UTRA capability information of the UE capability information, indicating the intra measurement function feature of the MF mode supported by the UE and the measurement function feature between the MF mode and the TDD or FDD mode using the bit information indicating the measurement function feature.

In a possible embodiment of the present disclosure, the step of indicating the function feature of the MF mode supported by the UE in the FGI parameter contained in the E-UTRA capability information of the UE capability information includes indicating the intran intra handover function feature of the MF mode supported by the UE in the FGI parameter contained in the E-UTRA capability information of the UE capability information using bit information indicating the handover function feature and/or bit information in a predetermined idle state. The bit information indicating the handover function feature includes bit information indicating a handover function feature within a mode and bit information indicating a handover function feature between different modes. The intran intra handover function feature of the MF mode includes an intra intra handover function feature of the MF mode, and a handover function feature between the MF mode and the TDD or FDD mode.

In a possible embodiment of the present disclosure, the step of indicating the intran intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intran intra handover function feature of the MF mode supported by the UE using fourth bit information in the predetermined idle state, indicating the handover function feature between the MF mode and the TDD mode supported by the UE using fifth bit information in the predetermined idle state, and indicating the handover function feature between the MF mode and the FDD mode supported by the UE using sixth bit information in the predetermined idle state.

In a possible embodiment of the present disclosure, the step of indicating the intran intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intran intra handover function feature of the MF mode supported by the UE using the bit information indicating the handover function feature within a mode, indicating the handover function feature between the MF mode and the TDD mode supported by the UE using fifth bit information in the predetermined idle state, and indicating the handover function feature between the MF mode and the FDD mode supported by the UE using sixth bit information in the predetermined idle state.

In a possible embodiment of the present disclosure, the step of indicating the intran intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intran intra handover function feature of the MF mode supported by the UE using the bit information indicating the handover function feature within a mode, indicating a handover function feature about the handover from the MF mode to the TDD or FDD mode supported by the UE using the bit information indicating the handover function feature between the modes, and indicating a handover function feature about the handover from the TDD or FDD mode to the MF mode supported by the UE using sixth bit information in the predetermined idle state.

In a possible embodiment of the present disclosure, the step of indicating the intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intra handover function feature of the MF mode supported by the UE using the bit information indicating the handover function feature within a mode, and indicating the handover function feature between the MF mode and the TDD or FDD mode supported by the UE using sixth bit information in the predetermined idle state.

In a possible embodiment of the present disclosure, the step of indicating the intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intra handover function feature of the MF mode supported by the UE using the bit information indicating the handover function feature within a mode, indicating the handover function feature between the MF mode and the TDD mode supported by the UE using the bit information indicating the handover function feature between the modes, and indicating the handover function feature between the MF mode and the FDD mode supported by the UE using sixth bit information in the predetermined idle state.

In a possible embodiment of the present disclosure, the step of indicating the intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intra handover function feature of the MF mode supported by the UE using the bit information indicating the handover function feature within a mode, indicating the handover function feature between the MF mode and the FDD mode supported by the UE using the bit information indicating the handover function feature between the modes, and indicating the handover function feature between the MF mode and the TDD mode supported by the UE using sixth bit information in the predetermined idle state.

In a possible embodiment of the present disclosure, the step of indicating the intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intra handover function feature of the MF mode supported by the UE using the bit information indicating the handover function feature within a mode, and indicating the handover function feature between the MF mode and the TDD or FDD mode supported by the UE using the bit information indicating the handover function feature between the modes.

In another aspect, the present disclosure provides in some embodiments a device for indicating a UE capability for use in a UE, including: a reception module configured to receive from a base station a request message for acquiring the UE capability; an indication module configured to indicate a capability of an MF mode supported by the UE in UE capability information, the capability of the MF mode supported by the UE including a frequency band and/or a function feature of the MF mode supported by the UE; and a transmission module configured to transmit the UE capability information to the base station.

In a possible embodiment of the present disclosure, the indication module includes: a first indication sub-module configured to indicate the frequency band of the MF mode supported by the UE in a RF parameter contained in E-UTRA capability information of the UE capability information; and/or a second indication sub-module configured to indicate the function feature of the MF mode supported by the UE in an FGI parameter contained in the E-UTRA capability information of the UE capability information, the function feature of the MF mode including a measurement function feature and an intra handover function feature of the MF mode.

In a possible embodiment of the present disclosure, the first indication sub-module includes: a first indication unit configured to, when a frequency band number used in the MF mode is same as a frequency band number used in an LAA mode, indicate the frequency band of the MF mode supported by the UE in the RF parameter contained in the E-UTRA capability information of the UE capability information using the frequency band number and a network type, the network type including the MF mode and/or the LAA mode; and a second indication unit configured to, when a frequency band number used in the MF mode is different from a frequency band number used in the LAA mode, indicate the frequency band of the MF mode supported by the UE in the RF parameter contained in the E-UTRA capability information of the UE capability information using the frequency band number.

In a possible embodiment of the present disclosure, the second indication sub-module includes a third indication unit configured to indicate the intra measurement function feature of the MF mode supported by the UE in the FGI parameter contained in the E-UTRA capability information of the UE capability information using bit information indicating the measurement function feature and/or bit information in a predetermined idle state. The intra measurement function feature of the MF mode includes an intra measurement function feature of the MF mode, a measurement function feature between the MF mode and a TDD mode, or a measurement function feature between the MF mode and an FDD mode.

In a possible embodiment of the present disclosure, the third indication unit is further configured to, in the FGI parameter contained in the E-UTRA capability information of the UE capability information, indicate the intra measurement function feature of the MF mode using first bit information in the predetermined idle state, indicate the measurement function feature between the MF mode and the TDD mode supported by the UE using second bit information in the predetermined idle state, and indicate the measurement function feature between the MF mode and the FDD mode supported by the UE using third bit information in the predetermined idle state.

In a possible embodiment of the present disclosure, the third indication unit is further configured to, in the FGI parameter contained in the E-UTRA capability information of the UE capability information, indicate the intra measurement function feature of the MF mode using the bit information indicating the measurement function feature, indicate the measurement function feature between the MF mode and the TDD mode supported by the UE using second bit information in the predetermined idle state, and indicate the measurement function feature between the MF mode and the FDD mode supported by the UE using third bit information in the predetermined idle state.

In a possible embodiment of the present disclosure, the third indication unit is further configured to, in the FGI parameter contained in the E-UTRA capability information of the UE capability information, indicate the intra measurement function feature of the MF mode supported by the UE and the measurement function feature of the TDD or FDD mode supported by the UE in the MF mode using bit information indicating the measurement function feature, and indicate an intra measurement function feature of the MF mode supported by the UE in the TDD or in FDD mode using third bit information in the predetermined idle state.

In a possible embodiment of the present disclosure, the third indication unit is further configured to, in the FGI parameter contained in the E-UTRA capability information of the UE capability information, indicate the intra measurement function feature of the MF mode supported by the UE using the bit information indicating the measurement function feature, and indicate the measurement function feature between the MF mode and the TDD or FDD mode supported by the UE using third bit information in the predetermined idle state.

In a possible embodiment of the present disclosure, the third indication unit is further configured to, in the FGI parameter contained in the E-UTRA capability information of the UE capability information, indicate the intra measurement function feature of the MF mode supported by the UE and the measurement function feature between the MF mode and the TDD mode supported by the UE using the bit information indicating the measurement function feature, and indicate the measurement function feature between the MF mode and the FDD mode supported by the UE using third bit information in the predetermined idle state.

In a possible embodiment of the present disclosure, the third indication unit is further configured to, in the FGI parameter contained in the E-UTRA capability information of the UE capability information, indicate the intra measurement function feature of the MF mode supported by the UE and the measurement function feature between the MF mode and the FDD mode supported by the UE using the bit information indicating the measurement function feature, and indicate the measurement function feature between the MF mode and the TDD mode supported by the UE using third bit information in the predetermined idle state.

In a possible embodiment of the present disclosure, the third indication unit is further configured to, in the FGI parameter contained in the E-UTRA capability information of the UE capability information, indicate the intra measurement function feature of the MF mode supported by the UE and the measurement function feature between the MF mode and the TDD or FDD mode using the bit information indicating the measurement function feature.

In a possible embodiment of the present disclosure, the second indication sub-module includes a fourth indication unit configured to indicate the intra handover function feature of the MF mode supported by the UE in the FGI parameter contained in the E-UTRA capability information of the UE capability information using bit information indicating the handover function feature and/or bit information in a predetermined idle state. The bit information indicating the handover function feature includes bit information indicating a handover function feature within a mode and bit information indicating a handover function feature between different modes. The intra handover function feature of the MF mode includes an intra handover function feature of the MF mode, and a handover function feature between the MF mode and the TDD or FDD mode.

In a possible embodiment of the present disclosure, the fourth indication unit is further configured to, in the FGI parameter contained in the E-UTRA capability information of the UE capability information, indicate the intra handover function feature of the MF mode supported by the UE using fourth bit information in the predetermined idle state, indicate the handover function feature between the MF mode and the TDD mode supported by the UE using fifth bit information in the predetermined idle state, and indicate the handover function feature between the MF mode and the FDD mode supported by the UE using sixth bit information in the predetermined idle state.

In a possible embodiment of the present disclosure, the fourth indication unit is further configured to, in the FGI parameter contained in the E-UTRA capability information of the UE capability information, indicate the intra handover function feature of the MF mode supported by the UE using the bit information indicating the handover function feature within a mode, indicate the handover function feature between the MF mode and the TDD mode supported by the UE using fifth bit information in the predetermined idle state, and indicate the handover function feature between the MF mode and the FDD mode supported by the UE using sixth bit information in the predetermined idle state.

In a possible embodiment of the present disclosure, the fourth indication unit is further configured to, in the FGI parameter contained in the E-UTRA capability information of the UE capability information, indicate the intra handover function feature of the MF mode supported by the UE using the bit information indicating the handover function feature within a mode, indicate a handover function feature about the handover from the MF mode to the TDD or FDD mode supported by the UE using the bit information indicating the handover function feature between the modes, and indicate a handover function feature about the handover from the TDD or FDD mode to the MF mode supported by the UE using sixth bit information in the predetermined idle state.

In a possible embodiment of the present disclosure, the fourth indication unit is further configured to, in the FGI parameter contained in the E-UTRA capability information of the UE capability information, indicate the intra handover function feature of the MF mode supported by the UE using the bit information indicating the handover function feature within a mode, and indicate the handover function feature between the MF mode and the TDD or FDD mode supported by the UE using sixth bit information in the predetermined idle state.

In a possible embodiment of the present disclosure, the fourth indication unit is further configured to, in the FGI parameter contained in the E-UTRA capability information of the UE capability information, indicate the intra handover function feature of the MF mode supported by the UE using the bit information indicating the handover function feature within a mode, indicate the handover function feature between the MF mode and the TDD mode supported by the UE using the bit information indicating the handover function feature between the modes, and indicate the handover function feature between the MF mode and the FDD mode supported by the UE using sixth bit information in the predetermined idle state.

In a possible embodiment of the present disclosure, the fourth indication unit is further configured to, in the FGI parameter contained in the E-UTRA capability information of the UE capability information, indicate the intra in handover function feature of the MF mode supported by the UE using the bit information indicating the handover function feature within a mode, indicate the handover function feature between the MF mode and the FDD mode supported by the UE using the bit information indicating the handover function feature between the modes, and indicate the handover function feature between the MF mode and the TDD mode supported by the UE using sixth bit information in the predetermined idle state.

In a possible embodiment of the present disclosure, the fourth indication unit is further configured to, in the FGI parameter contained in the E-UTRA capability information of the UE capability information, indicate the intra handover function feature of the MF mode supported by the UE using the bit information indicating the handover function feature within a mode, and indicate the handover function feature between the MF mode and the TDD or FDD mode supported by the UE using the bit information indicating the handover function feature between the modes.

In yet another aspect, the present disclosure provides in some embodiments a UE, including: a receiver configured to receive from a base station a request message for acquiring a UE capability; a processor configured to indicate a capability of an MF mode supported by the UE in UE capability information, the capability of the MF mode supported by the UE including a frequency band and/or a function feature of the MF mode supported by the UE; and a transmitter configured to transmit the UE capability information to the base station.

In still yet another aspect, the present disclosure provides in some embodiments a method for indicating a UE capability for use in a base station, including steps of: transmitting to a UE a request message for acquiring the UE capability; receiving UE capability information from the UE, the UE capability information including information indicating a capability of an MF mode supported by the UE, the capability of the MF mode supported by the UE including a frequency band and/or a function feature of the MF mode supported by the UE; and acquiring the information indicating the capability of the MF mode supported by the UE from the UE capability information.

In a possible embodiment of the present disclosure, the step of acquiring the information indicating the capability of the MF mode supported by the UE from the UE capability information includes: acquiring the frequency band of the MF mode supported by the UE from a RF parameter contained in E-UTRA capability information of the UE capability information; and/or acquiring the function feature of the MF mode supported by the UE from an FGI parameter contained in the E-UTRA capability information of the UE capability information, the function feature of the MF mode including a measurement function feature and an intra handover function feature of the MF mode.

In still yet another aspect, the present disclosure provides in some embodiments a device for indicating a UE capability for use in a base station, including: a transmission module configured to transmit to a UE a request message for acquiring the UE capability; a reception module configured to receive UE capability information from the UE, the UE capability information including information indicating a capability of an MF mode supported by the UE, the capability of the MF mode supported by the UE including a frequency band and/or a function feature of the MF mode supported by the UE; and a processing module configured to acquire the information indicating the capability of the MF mode supported by the UE from the UE capability information.

In a possible embodiment of the present disclosure, the processing module is further configured to acquire the frequency band of the MF mode supported by the UE from a RF parameter contained in E-UTRA capability information of the UE capability information, and/or acquire the function feature of the MF mode supported by the UE from an FGI parameter contained in the E-UTRA capability information of the UE capability information, the function feature of the MF mode including a measurement function feature and an intra handover function feature of the MF mode.

In still yet another aspect, the present disclosure provides in some in embodiments a base station, including: a transmitter configured to transmit to a UE a request message for acquiring a UE capability; a receiver configured to receive UE capability information from the UE, the UE capability information including information indicating a capability of an MF mode supported by the UE, the capability of the MF mode supported by the UE including a frequency band and/or a function feature of the MF mode supported by the UE; and a processor configured to acquire the information indicating the capability of the MF mode supported by the UE from the UE capability information.

According to the embodiments of the present disclosure, upon the receipt of the request message for acquiring the UE capability from the base station, the UE indicates the capability of the MF mode supported by the UE in the UE capability information, and transmit the UE capability information to the base station. In this way, it is able for the UE to indicate the capability of the MF mode to the base station and achieve relevant functions in the MF mode, thereby to solve the problem in the related art where it is impossible for the UE to achieve the relevant functions in the MF mode because the E-UTRA capability information does not include the capability indication information related to the MF mode. Further, the bit information indicating the function feature of the TDD or FDD mode supported by the UE in the FGI parameter is also used to indicate the function feature of the MF mode supported by the UE, so as to save FGI bits in the idle state. In addition, it is unnecessary for the FGI bits indicating both the function feature of the MF mode and the function feature of the TDD or FDD mode and the idle-state FGI bits indicating the MF mode supported by the UE to differentiate between the TDD and the FDD modes, so as to reduce the complexity in indicating the function features using the FGI bits.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

In the embodiments of the present disclosure, a UE may also be called as a terminal, a mobile station (MS), or a mobile terminal.

First Embodiment

Figure 1:
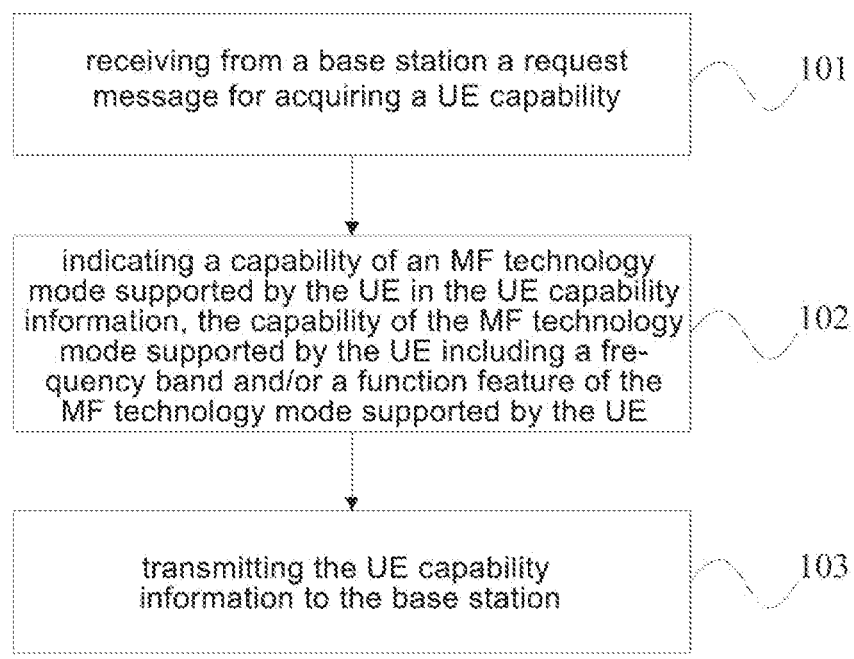
FIG. 1 is a flow chart of a method for indicating a UE capability according to some embodiments of the present disclosure.

As shown in FIG. 1, the present disclosure provides in this embodiment a method for indicating a UE capability for use in a UE, which includes the following steps.

Step 101: receiving from a base station a request message for acquiring the UE capability. Here, upon the receipt of the request message for acquiring the UE capability from the base station, the UE needs to report UE capability information supported by the UE to the base station.

Step 102: indicating a capability of an MF mode supported by the UE in the UE capability information, the capability of the MF mode supported by the UE including a frequency band and/or a function feature of the MF mode supported by the UE.

In an LTE system, the UE may report the capability of the UE to the base station through the UE capability information. For example, capability information about an E-UTRA network includes an access layer version number, a UE capability level, a Packet Data Convergence Protocol (PDCP) parameter, a physical layer parameter, a RF parameter, an Feature Group Indicator (FGI), and information about frequency bands for the other Radio Access Technologies (RATs) supported by the UE.

To be specific, capability information about an E-UTRA frequency band supported by the UE may be indicated by the RF parameter. The FGI is bit information having a length of, e.g., 32 bits. A group of function features supported by the UE in the E-UTRA may be indicated in the FGI. For example, the group of function features may include a frequency hopping function within a Physical Uplink Shared Channel (PUSCH) subframe, a function of transmitting a Channel Quality Indicator (CQI) and ACKnowledgement/Non-ACKnowledgement (ACK/NACK) of a Physical Uplink Control Channel (PUCCH), a measurement function (e.g., an inter-frequency measurement function), a 3G network measurement function, a 2G network measurement function, a handover capability (e.g., an inter-frequency handover capability), and a handover function between a TDD mode and an FDD mode. When the corresponding function feature is supported by the UE, a corresponding bit may be set as "1", and otherwise, it may be set as "0".

The UE may report the capability of the UE to the base station through the UE capability information. E-UTRA capability information of the UE capability information usually includes capability information about the TDD and FDD modes supported by the UE. Currently, the E-UTRA capability information of the UE merely indicates the capability related to the TDD or FDD mode. For example, the E-UTRA in frequency band supported by the UE may be indicated in the RF parameter, and the function features such as whether or not the UE supports an E-UTRA inter-frequency measurement function, a handover function from the E-UTRA to the 3G network, a handover function in the TDD or FDD mode and a handover function between the TDD mode and the FDD mode may be indicated in the FGI.

In this embodiment, it is able to indicate the capability of the MF mode supported by the UE through the E-UTRA capability information of the UE capability information, thereby to enable the UE to indicate the capability of the MF mode supported by the UE to the base station.

Step 103: transmitting the UE capability information to the base station. Here, the UE may report the UE capability information indicating the capability of the MF mode supported by the UE to the base station, so as to support the relevant functions in the MF mode.

According to the method in this embodiment, it is able for the UE to indicate the capability of the MF mode supported by the UE to the base station and achieve the relevant functions in the MF mode, thereby to solve the problem in the related art where it is impossible for the UE to achieve the relevant functions in the MF mode because the E-UTRA capability information does not include the capability indication information related to the MF mode.

Second Embodiment

Figure 2:
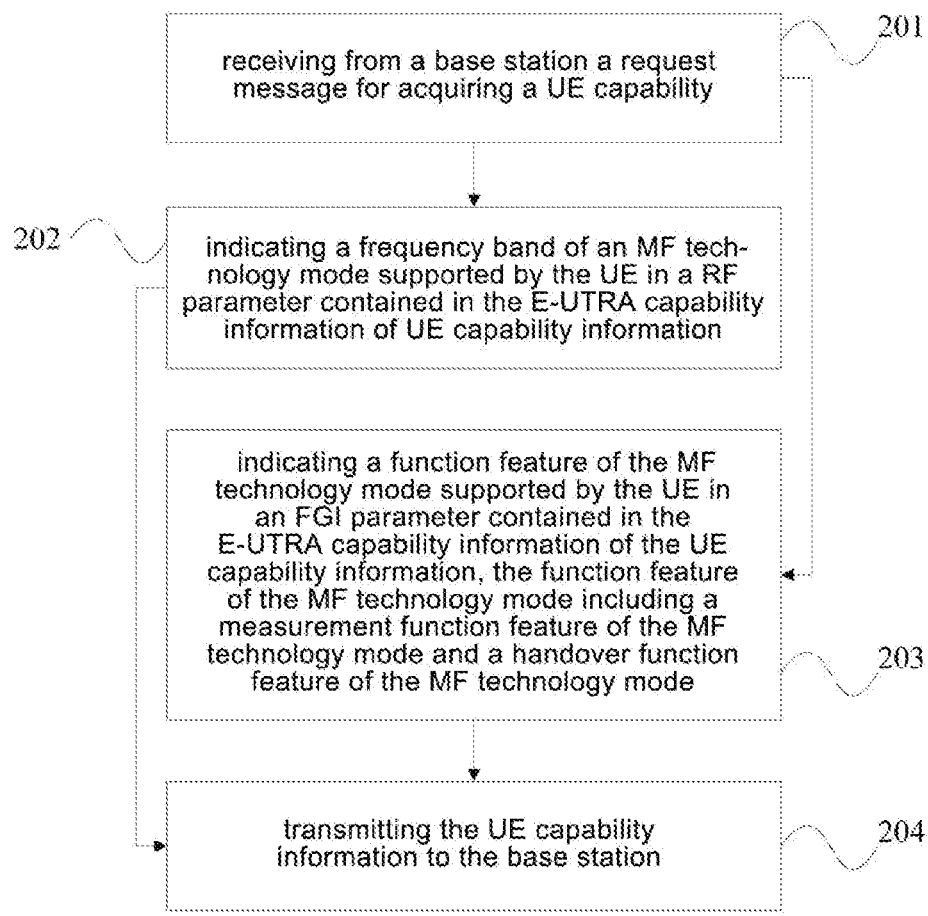
FIG. 2 is another flow chart of a method for indicating a UE capability according to some embodiments of the present disclosure.

As shown in FIG. 2, the present disclosure provides in this embodiment a method for indicating a UE capability for use in a UE, which includes the following steps.

Step 201: receiving from a base station a request message for acquiring the UE capability. Here, upon the receipt of the request message for acquiring the UE capability from the base station, the UE which has accessed to an E-UTRA cell needs to report E-UTRA capability information supported by the UE to the base station.

Step 202: indicating a frequency band of an MF mode supported by the UE in a RF parameter contained in the E-UTRA capability information of UE capability information; and/or Step 203: indicating a function feature of the MF mode supported by the UE in an FGI parameter contained in the E-UTRA capability information of the UE capability information, the function feature of the MF mode including an intra measurement function feature of the MF mode and an intra handover function feature of the MF mode.

The following description will be given by taking, but not limited to, an inter-frequency measurement function feature and an inter-frequency handover function feature as an example.

The UE may report the capability of the UE to the base station through the UE capability information. Usually, the E-UTRA capability information of the UE capability information includes capability information about TDD and FDD modes supported by the UE.

Here, the UE may indicate the frequency band of the MF mode supported by the UE in the RF parameter contained in the E-UTRA capability information, and indicate the function feature of the MF mode supported by the UE in the FGI parameter contained in the E-UTRA capability information, so as to enable the UE to indicate the capability of the MF mode supported by the UE to the base station.

The function feature of the MF mode includes an inter-frequency measurement function feature and an inter-frequency intra handover function feature of the MF mode. Usually, the UE may support the corresponding inter-frequency handover function feature merely when the UE supports the relevant inter-frequency measurement function feature. To be specific, when a bit of the relevant inter-frequency measurement function feature is set as 1, i.e., when the FGI parameter indicates that the UE supports the relevant inter-frequency measurement function feature, a bit of the corresponding inter-frequency handover function feature may be set as 1, i.e., the FGI parameter may indicate that the UE supports the corresponding inter-frequency measurement function feature. For example, a bit of the inter-frequency intra handover function feature of the MF, TDD or FDD mode may be set as 1 merely when a bit of the inter-frequency measurement function feature of the corresponding MF, TDD or FDD Mode is set as 1.

Step 204: transmitting the UE capability information to the base station. Here, the UE may report the UE capability information indicating the capability of the MF mode supported by the UE to the base station, so as to support the relevant functions of the MF mode.

According to the method in this embodiment of the present disclosure, the UE may indicate the frequency band of the MF mode supported by the UE in the RF parameter contained in the E-UTRA capability information, and indicate the function feature of the MF mode supported by the UE in the FGI parameter contained in the E-UTRA capability information, so as to indicate the capability of the MF mode supported by the UE and enable the UE to achieve the relevant functions in the MF mode, thereby to solve the problem in the related art where it is impossible for the UE to achieve the relevant functions in the MF mode because the E-UTRA capability information does not include the capability indication information related to the MF mode.

The frequency band of the TDD or FDD mode supported by the UE may be indicated in the RF parameter contained in the E-UTRA capability information using a frequency band list. In this embodiment, the UE may indicate the frequency band of the MF mode supported by the UE in the RF parameter contained in the E-UTRA capability information using the frequency band list. The frequency band of the MF mode may be indicated in two modes, i.e., Step 202 may be implemented in two modes.

Mode 1: Step 202 may include Step 2021 of, when a frequency band number used in the MF mode is same as a frequency band number used in an LAA mode, indicating the frequency band of the MF mode supported by the UE in the RF parameter contained in the E-UTRA capability information of the UE capability information using the frequency band number and a network type, the network type including the MF mode and/or the LAA mode.

An LAA technology is a physical layer technology introduced into the existing 3GPP standard and used at a non-licensed frequency band. Different from an MF technology, LAA carriers cannot be operated at the non-licensed frequency band individually to provide services to the UE, and instead, a carrier aggregation technology must be adopted, i.e., carriers at a licensed frequency band may be aggregated with the LAA carriers. The carriers at the licensed frequency band may serve as a primary cell (PCell) for providing the services to the UE, while the LAA carriers may serve as a secondary cell (SCell) for providing the services to the UE.

Here, when a non-licensed frequency band number used in the MF mode is same as a non-licensed frequency band number used in the LAA mode, e.g., Band 46, the frequency band of the MF mode supported by the UE may be indicated in the RF parameter contained in the E-UTRA capability information using the frequency band number and the network type. At this time, in the RF parameter contained in the E-UTRA capability information, apart from the frequency band number in the frequency band list, the network type may also be used to indicate the corresponding frequency band. The network type may include the MF mode and/or the LAA mode, and it may be used to indicate that one or both of the MF mode and the LAA mode are supported by the UE at the corresponding frequency band.

Mode 2: Step 202 may include Step 2022 of, when a frequency band number used in the MF mode is different from a frequency band number used in the LAA mode, indicating the frequency band of the MF mode supported by the UE in the RF parameter contained in the E-UTRA capability information of the UE capability information using the frequency band number.

Here, when the frequency band number used in the MF mode is different from the frequency band number used in the LAA mode, e.g., Band 46 and Band 255 having a same frequency range (5150 MHz to 5925 MHz) are used in the MF mode and the LAA mode respectively, the frequency band of the MF mode supported by the UE may be indicated in the RF parameter contained in the E-UTRA capability information using the frequency band number. At this time, it is able to differentiate the frequency band of the MF mode from that of the LAA mode merely through the in frequency band number. Hence, it is able to indicate the frequency band of the MF mode supported by the UE in the RF parameter contained in the E-UTRA capability information using the frequency band in the frequency band list.

At this time, it is able for the UE, in the above-mentioned two modes, to indicate the frequency band of the MF mode supported by the UE to the base station, and reasonably differentiate the frequency band of the MF mode from that of the LAA mode.

According to the method in this embodiment of the present disclosure, the UE may indicate the frequency band of the MF mode supported by the UE in the RF parameter contained in the E-UTRA capability information, reasonably differentiate the frequency band of the MF mode from that of the LAA mode, and indicate the function feature of the MF mode supported by the UE in the FGI parameter contained in the E-UTRA capability information, so as to indicate the capability of the MF mode supported by the UE and enable the UE to achieve the relevant functions in the MF mode, thereby to solve the problem in the related art where it is impossible for the UE to achieve the relevant functions in the MF mode because the E-UTRA capability information does not include the capability indication information related to the MF mode.

Third Embodiment

Figure 3:
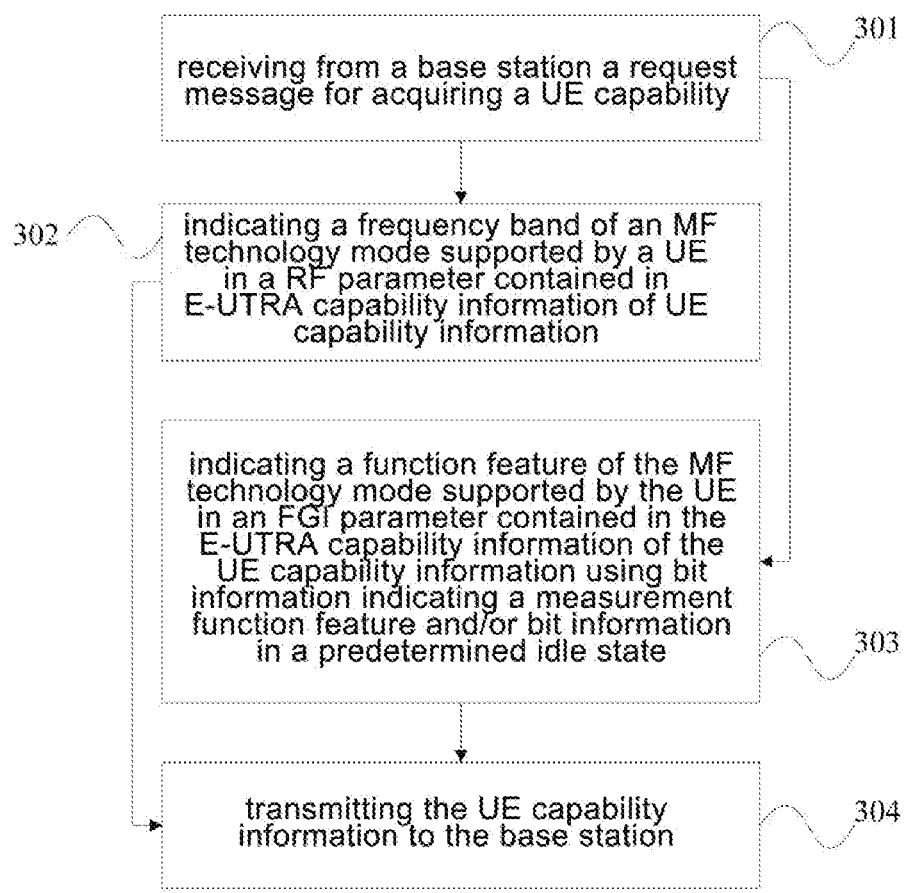
FIG. 3 is yet another flow chart of a method for indicating a UE capability according to some embodiments of the present disclosure.

As shown in FIG. 3, the present disclosure provides in this embodiment a method for indicating a UE capability for use in a UE, which includes the following steps.

Step 301: receiving from a base station a request message for acquiring the UE capability. Here, upon the receipt of the request message for acquiring the UE capability from the base station, the UE which has accessed to an E-UTRA cell needs to report E-UTRA capability information supported by the UE to the base station.

Step 302: indicating a frequency band of an MF mode supported by the UE in a RF parameter contained in the E-UTRA capability information of UE capability information; and/or Step 303: indicating a function feature of the MF mode supported by the UE in an FGI parameter contained in the E-UTRA capability information of the UE capability information using bit information indicating a measurement function feature and/or bit information in a predetermined idle state.

The UE may report the capability of the UE to the base station through the UE capability information. Usually, the E-UTRA capability information of the UE capability information includes capability information about TDD and FDD modes supported by the UE.

Here, in order to prevent the additional FGI bits in an idle state from being occupied in the MF mode, FGI redundant information may be used. To be specific, in the FGI parameter, the bit information indicating an inter-frequency measurement function feature of the TDD and FDD modes may also be used to indicate an inter-frequency measurement function feature of the MF mode, or the bit information in the predetermined idle state may be used to indicate the inter-frequency measurement function feature of the MF mode, so as to reduce the number of the occupied FGI bits in the idle state.

The UE may indicate the frequency band of the MF mode supported by the UE in the RF parameter contained in the E-UTRA capability information, and indicate the function feature of the MF mode supported by the UE in the FGI parameter contained in the E-UTRA capability information, so as to indicate the capability of the MF mode supported by the UE.

The function feature of the MF mode includes an inter-frequency measurement function feature and an inter-frequency intra handover function feature of the MF mode. Usually, the UE may support the corresponding inter-frequency handover function feature merely when the UE supports the relevant inter-frequency measurement function feature. To be specific, when a bit of the relevant inter-frequency measurement function feature is set as 1, i.e., when the FGI parameter indicates that the UE supports the relevant inter-frequency measurement function feature, a bit of the corresponding inter-frequency handover function feature may be set as 1, i.e., the FGI parameter may indicate that the UE supports the corresponding inter-frequency measurement function feature. For example, a bit of the inter-frequency intra handover function feature of the MF, TDD or FDD mode may be set as 1 merely when a bit of the inter-frequency measurement function feature of the corresponding ME TDD or FDD Mode is set as 1.

The inter-frequency measurement function feature of the MF mode includes an inter-frequency measurement function feature of the MF mode, and an inter-frequency measurement function feature between the MF mode and the TDD or FDD mode.

The inter-frequency measurement function feature between the MF mode and the TDD or FDD mode includes the inter-frequency measurement function feature of the TDD or FDD mode supported by the UE in the MF mode, and an inter-frequency measurement function feature of the MF mode supported by the UE in the TDD or FDD mode.

Step 304: transmitting the UE capability information to the base station. Here, the UE may report the UE capability information indicating the capability of the MF mode supported by the UE to the base station, so as to support the relevant functions of the MF mode.

According to the method in this embodiment of the present disclosure, the UE may indicate the frequency band of the MF mode supported by the UE in the RF parameter contained in the E-UTRA capability information, and indicate the function feature of the MF mode supported by the UE in the FGI parameter contained in the E-UTRA capability information, so as to indicate the capability of the MF mode supported by the UE and enable the UE to achieve the relevant functions in the MF mode. In addition, it is able to prevent the additional FGI bits from being occupied in the MF mode, and reduce the number of the occupied FGI bits in the idle state. As a result, it is able to solve the problem in the related art where it is impossible for the UE to achieve the relevant functions in the MF mode because the E-UTRA capability information does not include the capability indication information related to the MF mode.

In a possible embodiment of the present disclosure, the inter-frequency measurement function feature may be indicated in the FGI parameter contained in the E-UTRA capability information using, e.g., Bit 25. For example, when Bit 25 is 1, it means that the UE is capable of measuring and reporting the frequency band supported by the UE, and the frequency band supported by the UE may be indicated in the RF parameter contained in the E-UTRA capability information using the frequency band list. In addition, when Bit 25 is 1, it may also be used to indicate a function feature of measuring and reporting the frequency band of the FDD mode supported by the UE in the TDD mode, and a function feature of measuring and reporting the frequency band of the TDD mode supported by the UE in the FDD mode.

In this embodiment, the function feature of measuring and reporting the frequency band of the MF mode supported by the UE in the MF mode, i.e., the inter-frequency measurement function feature of the MF mode, the function feature of measuring and reporting the frequency band of the TDD or FDD mode of supported by the UE in the MF mode, or the function feature measuring and reporting the frequency band of the MF mode supported by the UE in the TDD or FDD mode may be indicated in the FGI parameter using Bit 25 or the bit information in the idle state in the following seven modes.

Mode 1: Step 303 may include Step 3031 of, in the FGI parameter contained in the E-UTRA capability information of the UE capability information, indicating the inter-frequency measurement function feature of the MF mode using first bit information in the predetermined idle state, indicating the inter-frequency measurement function feature between the MF mode and the TDD mode supported by the UE using second bit information in the predetermined idle state, and indicating the inter-frequency measurement function feature between the MF mode and the FDD mode supported by the UE using third bit information in the predetermined idle state.

At this time, the inter-frequency measurement function feature of the MF mode, the inter-frequency measurement function feature between the MF mode and the TDD mode and the inter-frequency measurement function feature between the MF mode and the FDD mode may be indicated using three additional bits information in the FGI parameter, so as not to interfere with the other information.

Mode 2: Step 303 may include Step 3032 of, in the FGI parameter contained in the E-UTRA capability information of the UE capability information, indicating the inter-frequency measurement function feature of the MF mode using the bit information indicating the inter-frequency measurement function feature, indicating the inter-frequency measurement function feature between the MF mode and the TDD mode supported by the UE using second bit information in the predetermined idle state, and indicating the inter-frequency measurement function feature between the MF mode and the FDD mode supported by the UE using third bit information in the predetermined idle state.

The UE may not be in the MF. TDD and FDD modes simultaneously, so indication information about the function feature of the MF mode may be carried in some FGI bits, e.g., Bit 25.

Here, through indicating the inter-frequency measurement function feature of the MF mode using the bit information indicating the inter-frequency measurement function feature in the FGI parameter, i.e., Bit 25, it is able to prevent the additional FGI bits in the idle state from being occupied in the MF mode, and reduce the number of the occupied FGI bits in the idle state. In addition, through indicating the inter-frequency measurement function feature between the MF mode and the TDD mode and the inter-frequency measurement function feature between the MF mode and the FDD mode using the 2-bit information in the idle state in the FIG parameter, it is able to prevent the bit information from interfering with the other information.

When the UE is in the MF mode, the function feature of measuring and reporting the frequency band of the MF mode supported by the UE may be indicated using Bit 25 in the FGI parameter. When the UE is switched from the MF mode into the TDD or FDD mode, the function feature of measuring and reporting the frequency band of the TDD or FDD mode supported by the UE, or measuring and reporting the frequency band of the FDD mode supported by the UE in the TDD mode, or measuring and reporting the frequency band of the TDD mode supported by the UE in the FDD mode, may be indicated using Bit 25 in the FGI parameter.

The inter-frequency measurement function feature between the MF mode and the TDD mode includes a function feature of measuring and reporting the frequency band of the TDD mode supported by the UE in the MF mode, and a function feature of measuring and reporting the frequency band of the MF mode supported by the UE in the TDD mode.

The inter-frequency measurement function feature between the MF mode and the FDD mode includes a function feature of measuring and reporting the frequency band of the FDD mode supported by the UE in the MF mode, and a function feature of measuring and reporting the frequency band of the MF mode supported by the UE in the FDD mode.

It is unnecessary for Bit 25 and the bit information in the idle state indicating the function feature of the MF mode supported by the UE to differentiate between the TDD and FDD modes, i.e., it is unnecessary for the UE to report the FGI parameter again when its mode has been changed. As a result, it is able to reduce the complexity in indicating the function features using the FGI bits.

For example, as shown in Table 1, the UE may indicate the inter-frequency measurement function feature of the TDD or FDD mode supported by the UE, the inter-frequency measurement function feature between the TDD mode and the FDD mode, and the inter-frequency measurement function feature of the MF mode supported by the UE using Bit 25 in the FGI parameter. In addition, the UE may indicate the inter-frequency measurement function feature between the MF mode and the TDD mode using Bit 131 in the idle state in the FGI parameter, and indicate the inter-frequency measurement function feature between the MF mode and the FDD mode using Bit 132 in the idle state in the FGI parameter.

TABLE 1

| | |
|---|---|
| Bit 25 | Inter-frequency measurement function feature of the TDD or FDD mode, and inter-frequency measurement function feature between the TDD mode and the FDD mode Measurement function feature of the MF mode |
| Bit 131 | Inter-frequency measurement function feature between the MF mode and the TDD mode |
| Bit 132 | Inter-frequency measurement function feature between the MF mode and the FDD mode |

Mode 3: Step 303 may include Step 3033 of, in the FGI parameter contained in the E-UTRA capability information of the UE capability information, indicating the inter-frequency measurement function feature of the MF mode to supported by the UE and the inter-frequency measurement function feature of the TDD or FDD mode supported by the UE in the MF mode using the bit information indicating the measurement function feature, and indicating the inter-frequency measurement function feature of the MF mode supported by the UE in the TDD or FDD mode using third bit information in the predetermined idle state.

If the measurement function feature of the TDD mode or FDD mode supported by the UE in the MF mode is same as that in MF mode, the indication information about the function feature of the MF mode may be carried in some FGI bits, e.g., Bit 25 may be used to indicate the inter-frequency measurement function feature of the MF mode supported by the UE and the inter-frequency measurement function feature of the TDD or FDD mode supported by the UE simultaneously.

Here, the bit information indicating the inter-frequency measurement function feature in the FGI parameter, i.e., Bit 25, may be used to indicate the inter-frequency measurement function feature of the MF mode and the inter-frequency measurement function feature of the TDD or FDD mode supported by the UE in the MF mode. In this way, it is able to prevent the additional FGI bits in the idle state from being occupied in the MF mode, and reduce the number of the occupied FGI bits in the idle state. In addition, 1-bit information in the idle state in the FGI parameter may be used to indicate the inter-frequency measurement function feature of the MF mode supported by the UE in the TDD or FDD mode, so as to prevent the bit information from interfering with the other information.

Bit 25 in the FGI parameter may be used to indicate different function features when the UE is in different modes. When the UE is in the MF mode, Bit 25 in the FGI parameter may be used to indicate the function feature of measuring and reporting the frequency band of the MF mode supported by the UE, and the function feature of measuring and reporting the frequency band of the TDD or FDD mode supported by the UE. When the UE is switched from the MF mode to the TDD or FDD mode, Bit 25 in the FGI parameter may be used to indicate the function feature of measuring and reporting the frequency band of the FDD mode supported by the UE in the TDD mode, or the function feature of measuring and reporting the frequency band of the TDD mode supported by the UE in the FDD mode.

It is unnecessary for Bit 25 and the bit information in the idle state indicating the function feature of the MF mode supported by the UE to differentiate between the TDD and FDD modes, i.e., it is unnecessary for the UE to report the FGI parameter again when its mode has been changed. As a result, it is able to reduce the complexity in indicating the function features using the FGI bits.

For example, as shown in Table 2, the UE may indicate the inter-frequency measurement function feature of the TDD or FDD mode supported by the UE, the inter-frequency measurement function feature between the TDD mode and the FDD mode, the inter-frequency measurement function feature of the MF mode, and the inter-frequency measurement function feature of the TDD or FDD mode supported by the UE in the MF mode using Bit 25 in the FGI parameter. In addition, the UE may indicate the inter-frequency measurement function feature of the MF mode supported by the UE in the TDD or FDD mode using Bit 132 in the idle state in the FGI parameter.

TABLE 2

| Bit 25 | Inter-frequency measurement function feature of the TDD or FDD mode, and inter-frequency measurement function feature between the TDD mode and the FDD mode |
| --- | --- |
| | Inter-frequency measurement function feature of the MF mode |

TABLE 2-continued

| | Inter-frequency measurement function feature of the TDD or FDD mode supported by the UE in the MF mode |
| --- | --- |
| Bit 132 | Inter-frequency measurement function feature of the MF mode supported by the UE in the TDD or FDD mode |

Mode 4: Step 303 may include Step 3034 of, in the FGI parameter contained in the E-UTRA capability information of the UE capability information, indicating the inter-frequency measurement function feature of the MF mode supported by the UE using the bit information indicating the inter-frequency measurement function feature, and indicating the inter-frequency measurement function feature between the MF mode and the TDD or FDD mode supported by the UE using third bit information in the predetermined idle state.

If the measurement function feature of the TDD mode supported by the UE in the MF mode is same as that in the MF mode, it is able to reduce the number of the occupied FGI bits in the idle state through the redundant information. For example, an additional FGI bit may be used to indicate the inter-frequency measurement function feature between the MF mode and the TDD or FDD mode supported by the UE.

Here, the bit information indicating the inter-frequency measurement function feature in the FGI parameter. i.e., Bit 25, may be used to indicate the inter-frequency measurement function feature of the MF mode, and the same bit information in the idle state may be used to indicate the inter-frequency measurement function feature between the MF mode and the TDD or FDD mode, so as to prevent the additional FGI bits in the idle state from being occupied in the MF mode, and reduce the number of the occupied FGI bits in the idle state.

It is unnecessary for Bit 25 and the bit information in the idle state indicating the function feature of the MF mode supported by the UE to differentiate between the TDD and FDD modes, i.e., it is unnecessary for the UE to report the FGI parameter again when its mode has been changed. As a result, it is able to reduce the complexity in indicating the function features using the FGI bits.

For example, as shown in Table 3, the UE may indicate the inter-frequency measurement function feature of the TDD or FDD mode supported by the UE, the inter-frequency measurement function feature between the TDD mode and the FDD mode, and the inter-frequency measurement function feature of the MF mode supported by the UE using Bit 25 in the FGI parameter. In addition, the UE may indicate the inter-frequency measurement function feature between the MF mode and the TDD mode and the inter-frequency measurement function feature between the MF mode and the FDD mode using Bit 132 in the idle state in the FGI parameter.

TABLE 3

| Bit 25 | Inter-frequency measurement function feature of the TDD or FDD mode, and inter-frequency measurement function feature between the TDD mode and the FDD mode |
| --- | --- |
| | Measurement function feature of the MF mode |
| Bit 132 | Inter-frequency measurement function feature between the MF mode and the TDD mode |
| | Inter-frequency measurement function feature between the MF mode and the FDD mode |

Mode 5: Step 303 may include Step 3035 of, in the FGI parameter contained in the E-UTRA capability information of the UE capability information, indicating the inter-frequency measurement function feature of the MF mode supported by the UE and the inter-frequency measurement function feature between the MF mode and the TDD mode supported by the UE using the bit information indicating the measurement function feature, and indicating the inter-frequency measurement function feature between the MF mode and the FDD mode supported by the UE using third bit information in the predetermined idle state.

If the intra measurement function feature of the MF mode supported by the UE in the TDD mode is same as that of the FDD mode supported by the UE in the TDD mode, it is able to reduce the number of the occupied FGI bits in the idle state through the redundant information. For example, Bit 25 in the FGI parameter may be used to indicate the inter-frequency measurement function feature of the MF mode and the inter-frequency measurement function feature between the MF mode and the TDD mode simultaneously.

Here, the bit information indicating the inter-frequency measurement function feature in the FGI parameter, i.e., Bit 25, may be used to indicate the inter-frequency measurement function feature of the MF mode and the inter-frequency measurement function feature between the MF mode and the TDD mode. In this way, it is able to prevent the additional FGI bits in the idle state from being occupied in the MF mode, and reduce the number of the occupied FGI bits in the idle state. In addition, 1-bit information in the idle state in the FGI parameter may be used to indicate the inter-frequency measurement function feature between the MF mode and the FDD mode, so as to prevent the bit information from interfering with the other information.

Bit 25 in the FGI parameter may be used to indicate different function features when the UE is in different modes. When the UE is in the MF mode, Bit 25 in the FGI parameter may be used to indicate the function feature of measuring and reporting the frequency band of the MF mode supported by the UE, and the function feature of measuring and reporting the frequency band of the TDD mode supported by the UE. When the UE is switched from the MF mode to the TDD mode, Bit 25 in the FGI parameter may be used to indicate the function feature of measuring and reporting the frequency band of the FDD mode or the MF mode supported by the UE. When the UE is in the FDD mode, Bit 25 in the FGI parameter may be used to indicate the function feature of measuring and reporting the frequency band of the TDD mode supported by the UE.

It is unnecessary for Bit 25 and the bit information in the idle state indicating the function feature of the MF mode supported by the UE to differentiate between the TDD and FDD modes, i.e., it is unnecessary for the UE to report the FGI parameter again when its mode has been changed. As a result, it is able to reduce the complexity in indicating the function features using the FGI bits.

For example, as shown in Table 4, the UE may indicate the inter-frequency measurement function feature of the TDD or FDD mode supported by the UE, the inter-frequency measurement function feature between the TDD mode and the FDD mode, the inter-frequency measurement function feature of the MF mode, and the inter-frequency measurement function feature between the MF mode and the TDD mode using Bit 25 in the FGI parameter. In addition, the UE may indicate the inter-frequency measurement function feature between the MF mode and the FDD mode using Bit 132 in the idle state in the FGI parameter.

TABLE 4

| Bit 25 | Inter-frequency measurement function feature of the TDD or FDD mode, and inter-frequency measurement function feature between the TDD mode and the FDD mode Measurement function feature of the MF mode Inter-frequency measurement function feature between the MF mode and the TDD mode |
|---|---|
| Bit 132 | Inter-frequency measurement function feature between the MF mode and the FDD mode |

Mode 6: Step 303 may include Step 3036 of, in the FGI parameter contained in the E-UTRA capability information of the UE capability information, indicating the inter-frequency measurement function feature of the MF mode supported by the UE and the inter-frequency measurement function feature between the MF mode and the FDD mode supported by the UE using the bit information indicating the inter-frequency measurement function feature, and indicating the inter-frequency measurement function feature between the MF mode and the TDD mode supported by the UE using third bit information in the predetermined idle state.

If the intra measurement function feature of the MF mode supported by the UE in the FDD mode is same as that of the TDD mode supported by the UE in the FDD mode, it is able to reduce the number of the occupied FGI bits in the idle state through the redundant information. For example, Bit 25 in the FGI parameter may be used to indicate the inter-frequency measurement function feature of the MF mode in and the inter-frequency measurement function feature between the MF mode and the FDD mode simultaneously.

Here, the bit information indicating the inter-frequency measurement function feature in the FGI parameter, i.e., Bit 25, may be used to indicate the inter-frequency measurement function feature of the MF mode and the inter-frequency measurement function feature between the MF mode and the FDD mode. In this way, it is able to prevent the additional FGI bits in the idle state from being occupied in the MF mode, and reduce the number of the occupied FGI bits in the idle state. In addition, 1-bit information in the idle state in the FGI parameter may be used to indicate the inter-frequency measurement function feature between the MF mode and the TDD mode, so as to prevent the bit information from interfering with the other information.

Bit 25 in the FGI parameter may be used to indicate different function features when the UE is in different modes. When the UE is in the MF mode, Bit 25 in the FGI parameter may be used to indicate the function feature of measuring and reporting the frequency band of the MF mode supported by the UE, and the function feature of measuring and reporting the frequency band of the FDD mode supported by the UE. When the UE is switched from the MF mode to the FDD mode, Bit 25 in the FGI parameter may be used to indicate the function feature of measuring and reporting the frequency band of the TDD mode or the MF mode supported by the UE. When the UE is in the TDD mode, Bit 25 in the FGI parameter may be used to indicate the function feature of measuring and reporting the frequency band of the FDD mode supported by the UE.

It is unnecessary for Bit 25 and the bit information in the idle state indicating the function feature of the MF mode supported by the UE to differentiate between the TDD and FDD modes, i.e., it is unnecessary for the UE to report the FGI parameter again when its mode has been changed. As a result, it is able to reduce the complexity in indicating the function features using the FGI bits.

For example, as shown in Table 5, the UE may indicate the inter-frequency measurement function feature of the TDD or FDD mode supported by in the UE, the inter-frequency measurement function feature between the TDD mode and the FDD mode, the inter-frequency measurement function feature of the MF mode, and the inter-frequency measurement function feature between the MF mode and the FDD mode using Bit 25 in the FGI parameter. In addition, the UE may indicate the inter-frequency measurement function feature between the MF mode and the TDD mode using Bit 132 in the idle state in the FGI parameter.

TABLE 5

| | |
|---|---|
| Bit 25 | Inter-frequency measurement function feature of the TDD or FDD mode, and inter-frequency measurement function feature between the TDD mode and the FDD mode<br>Measurement function feature of the MF mode<br>Inter-frequency measurement function feature between the MF mode and the FDD mode |
| Bit 132 | Inter-frequency measurement function feature between the MF mode and the TDD mode |

Mode 7: Step 303 may include Step 3037 of, in the FGI parameter contained in the E-UTRA capability information of the UE capability information, indicating the inter-frequency measurement function feature of the MF mode supported by the UE and the inter-frequency measurement function feature between the MF mode and the TDD or FDD mode using the bit information indicating the inter-frequency measurement function feature.

Here, through indicating the inter-frequency measurement function feature of the MF mode and the inter-frequency measurement function feature between the MF mode and the TDD or FDD mode using the bit information indicating the inter-frequency measurement function feature in the FGI parameter, i.e., Bit 25, it is able to reduce the number of the occupied FGI bits in the idle state in the best manner.

At this time, Bit 25 in the FGI parameter may be used to indicate the inter-frequency measurement function feature of any mode supported by the UE (i.e., TDD/FDD/MF), i.e., indicate the function feature of measuring and reporting the frequency band of any mode supported by the UE in any mode (i.e., TDD/FDD/MF). When Bit 25 in the FGI parameter is set as 1, it means the UE is capable of measuring and reporting any frequency band supported by the UE.

For example, as shown in Table 6, the UE may indicate the inter-frequency measurement function feature of the TDD or FDD mode supported by the UE, the inter-frequency measurement function feature between the TDD mode and the FDD mode, the inter-frequency measurement function feature of the MF mode, the inter-frequency measurement function feature between the MF mode and the TDD mode, and the inter-frequency measurement function feature between the MF mode and the FDD mode using Bit 25 in the FGI parameter.

TABLE 6

| | |
|---|---|
| Bit 25 | Inter-frequency measurement function feature of the TDD or FDD mode, and inter-frequency measurement function feature between the TDD mode and the FDD mode<br>Inter-frequency measurement function feature of the MF mode<br>Inter-frequency measurement function feature between the MF mode and the TDD mode<br>Inter-frequency measurement function feature between the MF mode and the FDD mode |

According to the method in this embodiment of the present disclosure, the UE may indicate the frequency band of the MF mode supported by the UE in the RF parameter contained in the E-UTRA capability information, and indicate the function feature of the MF mode supported by the UE in the FGI parameter contained in the E-UTRA capability information, so as to indicate the capability of the MF mode supported by the UE and enable the UE to achieve the relevant functions in the MF mode. In addition, it is able to prevent the additional FGI bits from being occupied in the MF mode, and reduce the number of the occupied FGI bits in the idle state. As a in result, it is able to solve the problem in the related art where it is impossible for the UE to achieve the relevant functions in the MF mode because the E-UTRA capability information does not include the capability indication information related to the MF mode.

Fourth Embodiment

Figure 4:
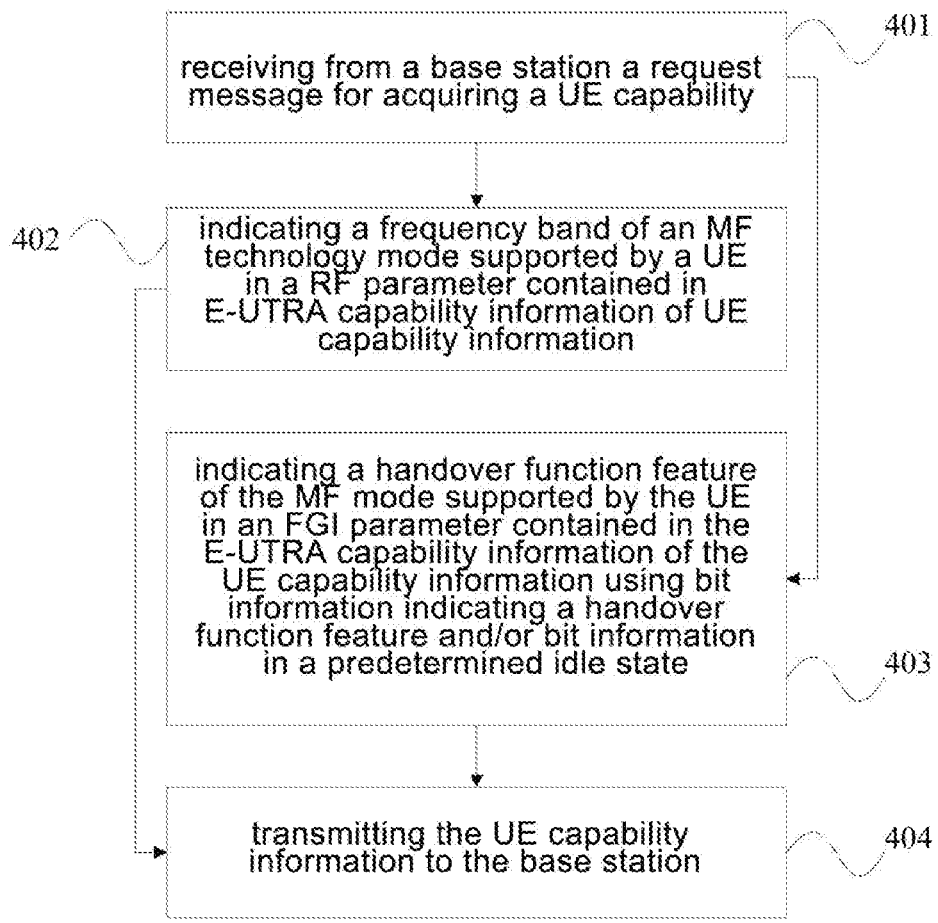
FIG. 4 is still yet another flow chart of a method for indicating a UE capability according to some embodiments of the present disclosure.

As shown in FIG. 4, the present disclosure provides in this embodiment a method for indicating a UE capability for use in a UE, which includes the following steps.

Step 401: receiving from a base station a request message for acquiring the UE capability. Here, upon the receipt of the request message for acquiring the UE capability from the base station, the UE which has accessed to an E-UTRA cell needs to report E-UTRA capability information supported by the UE to the base station.

Step 402: indicating a frequency band of an MF mode supported by the UE in a RF parameter contained in the E-UTRA capability information of UE capability information; and/or Step 403: indicating an intra handover function feature of the MF mode supported by the UE in an FGI parameter contained in the E-UTRA capability information of the UE capability information using bit information indicating a handover function feature and/or bit information in a predetermined idle state.

The UE may report the capability of the UE to the base station through the UE capability information. Usually, the E-UTRA capability information of the UE capability information includes capability information about TDD and FDD modes supported by the UE.

Here, in order to prevent the additional FGI bits in an idle state from being occupied in the MF mode, FGI redundant information may be used. To be specific, in the FGI parameter, the bit information indicating an inter-frequency intra handover function feature of the TDD and FDD modes may also be used to indicate an inter-frequency intra handover function feature of the MF mode, or the bit information in the predetermined idle state may be used to indicate the inter-frequency intra handover function feature of the MF model, so as to reduce the number of the occupied FGI bits in the idle state.

The UE may indicate the frequency band of the MF mode supported by the UE in the RF parameter contained in the E-UTRA capability information, and indicate the function feature of the MF mode supported by the UE in the FGI parameter contained in the E-UTRA capability information, so as to indicate the capability of the MF mode supported by the UE.

The function feature of the MF mode includes an inter-frequency measurement function feature and an inter-frequency intra handover function feature of the MF mode. Usually, the UE may support the corresponding inter-frequency handover function feature merely when the UE supports the relevant inter-frequency measurement function feature. To be specific, when a bit of the relevant inter-frequency measurement function feature is set as 1, i.e., when the FGI parameter indicates that the UE supports the relevant inter-frequency measurement function feature, a bit of the corresponding inter-frequency handover function feature may be set as 1, i.e., the FGI parameter may indicate that the UE supports the corresponding inter-frequency measurement function feature. For example, a bit of the inter-frequency intra handover function feature of the MF, TDD or FDD mode may be set as 1 merely when a bit of the inter-frequency measurement function feature of the corresponding MF, TDD or FDD Mode is set as 1.

The bit information indicating the inter-frequency handover function feature includes bit information indicating an inter-frequency handover function feature within a mode and bit information indicating an inter-frequency handover function feature between different modes. The inter-frequency intra handover function feature of the MF mode includes an inter-frequency intra handover function feature of the MF mode and an inter-frequency handover function feature between the MF mode and the TDD or FDD mode.

The inter-frequency handover function feature between the MF network mode and the TDD or FDD mode includes an inter-frequency handover function feature about the handover from the MF network mode to the TDD or FDD mode, and an inter-frequency handover function feature about the handover from the TDD or FDD mode to the MF network mode.

Step 404: transmitting the UE capability information to the base station. Here, the UE may report the UE capability information indicating the capability of the MF mode supported by the UE to the base station, so as to support the relevant functions of the MF mode.

According to the method in this embodiment of the present disclosure, the UE may indicate the frequency band of the MF mode supported by the UE in the RF parameter contained in the E-UTRA capability information, and indicate the function feature of the MF mode supported by the UE in the FGI parameter contained in the E-UTRA capability information, so as to indicate the capability of the MF mode supported by the UE and enable the UE to achieve the relevant functions in the MF mode. In addition, it is able to prevent the additional FGI bits from being occupied in the MF mode, and reduce the number of the occupied FGI bits in the idle state. As a result, it is able to solve the problem in the related art where it is impossible for the UE to achieve the relevant functions in the MF mode because the E-UTRA capability information does not include the capability indication information related to the MF mode.

Usually. Bit 13 in the FGI parameter contained in the E-UTRA capability information is used to indicate the inter-frequency handover function feature within a mode (the FDD or TDD mode), and Bit 30 in the FGI parameter is used to indicate the inter-frequency handover function feature between the modes (between the FDD mode and the TDD mode).

In this embodiment, the UE may use Bit 13 or the bit information in the idle state in the FGI parameter to indicate the inter-frequency intra handover function feature of the MF mode, and use Bit 30 or the bit information in the idle state in the FGI parameter to indicate the inter-frequency handover function feature between the MF mode and the FDD or TDD mode in the following seven ways.

Way 1: Step 403 may include Step 4031 of, in the FGI parameter contained in the E-UTRA capability information of the UE capability information, in indicating the inter-frequency intra handover function feature of the MF mode supported by the UE using fourth bit information in the predetermined idle state, indicating the inter-frequency handover function feature between the MF mode and the TDD mode supported by the UE using fifth bit information in the predetermined idle state, and indicating the inter-frequency handover function feature between the MF mode and the FDD mode supported by the UE using sixth bit information in the predetermined idle state.

At this time, the inter-frequency intra handover function feature of the MF mode, the inter-frequency handover function feature between the MF mode and the TDD mode and the inter-frequency handover function feature between the MF mode and the FDD mode may be indicated using three additional bits information in the FGI parameter, so as not to interfere with the other information.

Way 2: Step 403 may include Step 4032 of, in the FGI parameter contained in the E-UTRA capability information of the UE capability information, indicating the inter-frequency intra handover function feature of the MF mode supported by the UE using the bit information indicating the inter-frequency handover function feature within a mode, indicating the inter-frequency handover function feature between the MF mode and the TDD mode supported by the UE using fifth bit information in the predetermined idle state, and indicating the inter-frequency handover function feature between the MF mode and the FDD mode supported by the UE using sixth bit information in the predetermined idle state.

The UE may not be in the MF, TDD and FDD modes simultaneously, so indication information about the function feature of the MF mode may be carried in some FGI bits.

Here, through indicating the inter-frequency intra handover function feature of the MF mode using the bit information indicating the inter-frequency measurement function feature in the FGI parameter, i.e., Bit 13, it is able to prevent the additional FGI bits in the idle state from being occupied in the MF mode, and reduce the number of the occupied FGI bits in the idle state. In addition, through indicating the inter-frequency handover function feature between the MF mode and in the TDD mode and indicating the inter-frequency handover function feature between the MF mode and the FDD mode using the 2-bit information in the idle state in the FIG parameter, it is able to prevent the bit information from interfering with the other information.

When the UE is in the MF mode, the inter-frequency intra handover function feature of the MF mode supported by the UE may be indicated using Bit 13 in the FGI parameter. When the UE is switched from the MF mode into the TDD or FDD mode, the inter-frequency intra handover function feature of the TDD or FDD mode supported by the UE may be indicated using Bit 13 in the FGI parameter.

The inter-frequency handover function feature between the MF mode and the TDD mode includes an inter-frequency handover function feature about the handover from the MF mode to the TDD mode and an inter-frequency handover function feature about the handover from the TDD mode to the MF mode.

The inter-frequency handover function feature between the MF mode and the FDD mode includes an inter-frequency handover function feature about the handover from the MF mode to the FDD mode and an inter-frequency handover function feature about the handover from the FDD mode to the MF mode.

For example, as shown in Table 7, the UE may indicate the inter-frequency intra handover function feature of the TDD or the FDD mode and the inter-frequency intra handover function feature of the MF mode using Bit 13 in the FGI parameter, indicate the inter-frequency handover function feature between the TDD mode and the FDD mode using Bit 30 in the FGI parameter, indicate the inter-frequency handover function feature between the MF mode and the TDD mode using Bit 131 in the idle state in the FGI parameter, and indicate the inter-frequency handover function feature between the MF mode and the FDD mode using Bit 132 in the idle state in the FGI parameter.

TABLE 7

| Bit | Inter-frequency intra handover function feature of the TDD mode |
| --- | --- |
| 13 | Inter-frequency intra handover function feature of the FDD mode |
| | Intra handover function feature of the MF mode |
| Bit | Inter-frequency handover function feature between the TDD |
| 30 | mode and the FDD mode |
| Bit | Inter-frequency handover function feature between the MF mode |
| 131 | and the TDD mode |
| Bit | Inter-frequency handover function feature between the MF mode |
| 132 | and the FDD mode |

Way 3: Step 403 may include Step 4033 of, in the FGI parameter contained in the E-UTRA capability information of the UE capability information, indicating the inter-frequency intra handover function feature of the MF mode supported by the UE using the bit information indicating the inter-frequency handover function feature within a mode, indicating the inter-frequency handover function feature about the handover from the MF mode to the TDD or FDD mode supported by the UE using the bit information indicating the inter-frequency handover function feature between the modes, and indicating the inter-frequency handover function feature about the handover from the TDD or FDD mode to the MF mode supported by the UE using sixth bit information in the predetermined idle state.

If the handover function feature about the handover from MF mode to the TDD mode supported by the UE is same as that of the handover function feature about the handover from MF mode to the FDD mode supported by the UE, the indication information about the function feature of the MF mode may be carried in some FGI bits. e.g., Bit 30 may be used to indicate the inter-frequency handover function feature about the handover of from MF mode to the TDD mode and the handover from the MF mode to the FDD mode simultaneously.

Here, the bit information indicating the inter-frequency handover function feature in the FGI parameter, i.e., Bit 13, may be used to indicate the inter-frequency intra handover function feature of the MF mode, and the bit information indicating the inter-frequency handover function feature in the FGI parameter, i.e., Bit 30, may be used to indicate the inter-frequency handover function feature about the handover from the MF mode to the TDD or FDD mode. In this way, it is able to prevent the additional FGI bits in the idle state from being occupied in the MF mode, and reduce the number of the occupied FGI bits in the idle state. In addition, 1-bit information in the idle state in the FGI parameter may be used to indicate the inter-frequency handover function feature about the handover from the TDD or FDD mode to the MF mode, so as to prevent the bit information from interfering with the other information.

When the UE is in the MF mode, Bit 30 in the FGI parameter may be used to indicate the inter-frequency handover function feature about the handover from the MF mode to the TDD or FDD mode. When the UE is switched from the MF mode to the TDD or FDD mode, Bit 30 in the FGI parameter may be used to indicate the inter-frequency handover function feature about the handover from the TDD mode to the FDD mode, or the inter-frequency handover function feature about the handover from the FDD mode to the TDD mode.

For example, as shown in Table 8, the UE may indicate the inter-frequency intra handover function feature of the TDD or FDD mode, and the inter-frequency intra handover function feature of the MF mode using Bit 13 in the FGI parameter, indicate the inter-frequency handover function feature between the TDD mode and the FDD mode and the inter-frequency handover function feature about the handover from the MF mode to the TDD or FDD mode using Bit 30 in the FGI parameter, and indicate the inter-frequency handover function feature about the handover from the TDD or FDD mode to the MF mode using Bit 132 in the idle state in the FGI parameter

TABLE 8

| Bit | Inter-frequency intra handover function feature of the TDD mode |
| --- | --- |
| 13 | Inter-frequency intra handover function feature of the FDD mode |
| | Inter-frequency intra handover function feature of the MF mode |
| Bit | Inter-frequency handover function feature between the TDD |
| 30 | mode and the FDD mode |
| | Inter-frequency handover function feature about the handover |
| | from the MF mode to the TDD or FDD mode |
| Bit | Inter-frequency handover function feature about the handover |
| 132 | from the TDD or FDD mode to the MF mode |

Way 4: Step 403 may include Step 4034 of, in the FGI parameter contained in the E-UTRA capability information of the UE capability information, indicating the inter-frequency intra handover function feature of the MF mode supported by the UE using the bit information indicating the inter-frequency handover function feature within a mode, and indicating the inter-frequency handover function feature between the MF mode and the TDD or FDD mode supported by the UE using to sixth bit information in the predetermined idle state.

If the intra handover function feature of handover from the MF mode to the TDD mode supported by the UE in the MF mode is same as that of handover from the MF mode to the FDD mode supported by the UE, it is able to reduce the number of the occupied FGI bits in the idle state through the redundant information. For example, an additional FGI bit may be used to indicate the inter-frequency handover function feature between the MF mode and the TDD or FDD mode supported by the UE.

Here, the bit information indicating the inter-frequency handover function feature in the FGI parameter, i.e., Bit 13, may be used to indicate the inter-frequency intra handover function feature of the MF mode, and the same bit information in the idle state may be used to indicate the inter-frequency handover function feature between the MF mode and the TDD or FDD mode, so as to prevent the additional FGI bits in the idle state from being occupied in the MF mode, and reduce the number of the occupied FGI bits in the idle state.

For example, as shown in Table 9, the UE may indicate the inter-frequency intra handover function feature of the TDD or FDD mode and the inter-frequency intra handover function feature of the MF mode using Bit 13 in the FGI parameter, indicate the inter-frequency handover function feature between the TDD mode and the FDD mode using Bit 30 in the FGI parameter, and indicate the inter-frequency handover function feature about the handover from the MF mode to the TDD or FDD mode and the inter-frequency handover function feature about the handover from the TDD or FDD mode to the MF mode using Bit 132 in the idle state in the FGI parameter.

TABLE 9

| Bit | Inter-frequency intra handover function feature of the TDD mode |
| --- | --- |
| 13 | Inter-frequency intra handover function feature of the FDD mode |
|  | Intra handover function feature of the MF mode |
| Bit | Inter-frequency handover function feature between the TDD mode |
| 30 | and the FDD mode |
| Bit | Inter-frequency handover function feature about the handover from |
| 132 | the MF mode to the TDD or FDD mode |
|  | Inter-frequency handover function feature about the handover from |
|  | the TDD or FDD mode to the MF mode |

Way 5: Step 403 may include Step 4035 of, in the FGI parameter contained in the E-UTRA capability information of the UE capability information, indicating the inter-frequency intra handover function feature of the MF mode supported by the UE using the bit information indicating the inter-frequency handover function feature within a mode, indicating the inter-frequency handover function feature between the MF mode and the TDD mode supported by the UE using the bit information indicating the inter-frequency handover function feature between the modes, and indicating the inter-frequency handover function feature between the MF mode and the FDD mode supported by the UE using sixth bit information in the predetermined idle state.

If the intra handover function feature of handover from the TDD mode to the MF mode supported by the UE is same as that of handover from the TDD mode to the FDD mode supported by the UE, it is able to reduce the number of the occupied FGI bits in the idle state through the redundant information. For example, Bit 30 in the FGI parameter may be used to indicate the inter-frequency handover function feature between the MF mode and the TDD mode.

Here, the bit information indicating the inter-frequency handover function feature in the FGI parameter, i.e., Bit 13, may be used to indicate the inter-frequency intra handover function feature of the MF mode, and the bit information indicating the inter-frequency handover function feature in the FGI parameter, i.e., Bit 30, may be used to indicate the inter-frequency handover function feature between the MF mode and the TDD mode. In this way, it is able to prevent the additional FGI bits in the idle state from being occupied in the MF mode, and reduce the number of the occupied FGI bits in the idle state. In addition, the 1-bit information in the idle state in the FGI parameter may be used to indicate the inter-frequency handover function feature between the MF mode and the FDD mode, so as to prevent the bit information from interfering with the other information.

Bit 30 in the FGI parameter may be used to indicate different function features when the UE is in different modes. When the UE is in the MF mode, Bit 30 in the FGI parameter may be used to indicate the function feature of switching the MF mode to the TDD mode. When the UE is switched from the MF mode to the TDD mode, Bit 30 in the FGI parameter may be used to indicate the function feature of switching the TDD mode to the FDD mode or the MF mode. When the UE is in the FDD mode, Bit 30 in the FGI parameter may be used to indicate the function feature of switching the FDD mode to the TDD mode.

For example, as shown in Table 10, the UE may indicate the inter-frequency intra handover function feature of the TDD mode, the inter-frequency intra handover function feature of FDD mode and the inter-frequency intra handover function feature of MF mode using Bit 13 in the FGI parameter, indicate the inter-frequency handover function feature between the TDD mode and the FDD mode and the inter-frequency handover function feature between the MF mode and the TDD mode using Bit 30 in the FGI parameter, and indicate the inter-frequency handover function feature between the MF mode and the FDD mode using Bit 132 in the idle state in the FGI parameter.

TABLE 10

| Bit | Inter-frequency intra handover function feature of the TDD mode |
| --- | --- |
| 13 | Inter-frequency intra handover function feature of the FDD mode |
|  | Inter-frequency intra handover function feature of the MF mode |
| Bit | Inter-frequency handover function feature between the TDD |
| 30 | mode and the FDD mode |
|  | Inter-frequency handover function feature between the MF mode |
|  | and the TDD mode |
| Bit | Inter-frequency handover function feature between the MF mode |
| 132 | and the FDD mode |

Way 6: Step 403 may include Step 4036 of, in the FGI parameter contained in the E-UTRA capability information of the UE capability information, indicating the inter-frequency intra handover function feature of the MF mode supported by the UE using the bit information indicating the inter-frequency handover function feature within a mode, indicating the inter-frequency handover function feature between the MF mode and the FDD mode supported by the UE using the bit information indicating the inter-frequency handover function feature between the modes, and indicating the inter-frequency handover function feature between the MF mode and the TDD mode supported by the UE using sixth bit information in the predetermined idle state.

If the intra handover function feature of handover from the FDD mode to the MF mode supported by the UE is same as that of handover from the FDD mode to the TDD mode supported by the UE, it is able to reduce the number of the occupied FGI bits in the idle state through the redundant information. For example, Bit 30 in the FGI parameter may be used to indicate the inter-frequency handover function feature between the MF mode and the FDD mode.

Here, the bit information indicating the inter-frequency handover function feature in the FGI parameter, i.e., Bit 13, may be used to indicate the inter-frequency intra handover function feature of the MF mode, and the bit information indicating the inter-frequency handover function feature in the FGI parameter, i.e., Bit 30, may be used to indicate the inter-frequency handover function feature between the MF mode and the FDD mode. In this way, it is able to prevent the additional FGI bits in the idle state from being occupied in the MF mode, and reduce the number of the occupied FGI bits in the idle state. In addition, the 1-bit information in the idle state in the FGI parameter may be used to indicate the inter-frequency handover function feature between the MF mode and the TDD mode, so as to prevent the bit information from interfering with the other information.

Bit 30 in the FGI parameter may be used to indicate different function features when the UE is in different modes. When the UE is in the MF mode, Bit 30 in the FGI parameter may be used to indicate the function feature of switching the MF mode to the FDD mode. When the UE is switched from the MF mode to the FDD mode, Bit 30 in the FGI parameter may be used to indicate the function feature of switching the FDD mode to the TDD mode or the MF mode. When the UE is in the TDD mode, Bit 30 in the FGI parameter may be used to indicate the function feature of switching the TDD mode to the FDD mode.

For example, as shown in Table 11, the UE may indicate the inter-frequency intra handover function feature of the TDD, the inter-frequency intra handover function feature of the FDD mode, and the inter-frequency intra handover function feature of the MF mode using Bit 13 in the FGI parameter, indicating the inter-frequency handover function feature between the TDD mode and the FDD mode and the inter-frequency handover function feature between the MF mode and the FDD mode using Bit 30 in the FGI parameter, and indicate the inter-frequency handover function feature between the MF mode and the TDD mode using Bit 132 in the idle state in the FGI parameter.

TABLE 11

| Bit | |
|---|---|
| Bit 13 | Inter-frequency intra handover function feature of the TDD mode |
| | Inter-frequency intra handover function feature of the FDD mode |
| | Inter-frequency intra handover function feature of the MF mode |
| Bit 30 | Inter-frequency handover function feature between the TDD mode and the FDD mode |
| | Inter-frequency handover function feature between the MF mode and the FDD mode |
| Bit 132 | Inter-frequency handover function feature between the MF mode and the TDD mode |

Way 7: Step 403 may include Step 4037 of, in the FGI parameter contained in the E-UTRA capability information of the UE capability information, indicating the inter-frequency intra handover function feature of the MF mode supported by the UE using the bit information indicating the inter-frequency handover to function feature within a mode, and indicating the inter-frequency handover function feature between the MF mode and the TDD or FDD mode supported by the UE using the bit information indicating the inter-frequency handover function feature between the modes.

Here, through indicating the inter-frequency intra handover function feature of the MF mode using the bit information indicating the inter-frequency handover function feature within a mode in the FGI parameter, i.e., Bit 13, and indicating the inter-frequency measurement function feature between the MF mode and the TDD or FDD mode using the bit information indicating the inter-frequency handover function feature within a mode in the FGI parameter, i.e., Bit 30, it is able to reduce the number of the occupied FGI bits in the idle state in the best manner.

At this time, Bit 30 in the FGI parameter may be used to indicate the inter-frequency intra handover function feature of switching a current mode of the UE to any other modes (TDD/FDD/MF modes). When Bit 30 in the FGI parameter is set as 1, it means the UE is capable of being switched from the current mode to any other modes.

For example, as shown in Table 12, the UE may indicate the inter-frequency intra handover function feature of the TDD mode, the inter-frequency intra handover function feature of the FDD mode, and the inter-frequency intra handover function feature of the MF mode using Bit 13 in the FGI parameter, and indicate the inter-frequency handover function feature between the TDD mode and the FDD mode, the inter-frequency handover function feature between the MF mode and the FDD mode, and the inter-frequency handover function feature between the MF mode and the TDD mode using Bit 30 in the FGI parameter.

TABLE 12

| Bit | |
|---|---|
| Bit 13 | Inter-frequency intra handover function feature of the TDD mode |
| | Inter-frequency intra handover function feature of the FDD mode |
| | Inter-frequency intra handover function feature of the MF mode |

TABLE 12-continued

| Bit | |
|---|---|
| Bit 30 | Inter-frequency handover function feature between the TDD mode and the FDD mode |
| | Inter-frequency handover function feature between the MF mode and the FDD mode |
| | Inter-frequency handover function feature between the MF mode and the TDD mode |

According to the method in this embodiment of the present disclosure, the UE may indicate the frequency band of the MF mode supported by the UE in the RF parameter contained in the E-UTRA capability information, and indicate the function feature of the MF mode supported by the UE in the FGI parameter contained in the E-UTRA capability information, so as to indicate the capability of the MF mode supported by the UE and enable the UE to achieve the relevant functions in the MF mode. In addition, it is able to prevent the additional FGI bits from being occupied in the MF mode, and reduce the number of the occupied FGI bits in the idle state. As a result, it is able to solve the problem in the related art where it is impossible for the UE to achieve the relevant functions in the MF mode because the E-UTRA capability information does not include the capability indication information related to the MF mode.

Fifth Embodiment

Figure 5:
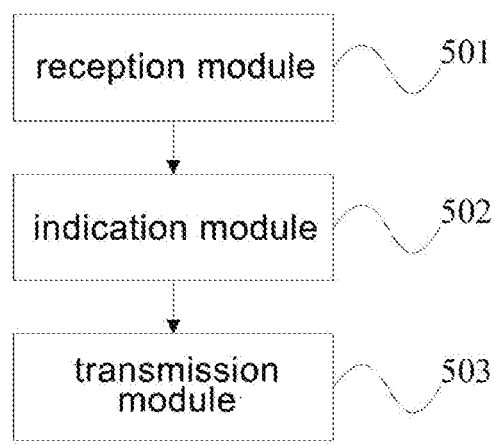
FIG. 5 is a schematic view showing a device for indicating a UE capability for use in a UE according to some embodiments of the present disclosure.

As shown in FIG. 5, the present disclosure provides in this embodiment a device for indicating a UE capability for use in a UE, which includes: a reception module 501 configured to receive from a base station a request message for acquiring the UE capability; an indication module 502 configured to indicate a capability of an MF mode supported by the UE in UE capability information, the capability of the MF mode supported by the UE including a frequency band and/or a function feature of the MF mode supported by the UE; and a transmission module 503 configured to transmit the UE capability information to the base station.

According to the device in this embodiment, it is able for the UE to indicate the capability of the MF mode supported by the UE to the base station and achieve the relevant functions in the MF mode, thereby to solve the problem in the related art where it is impossible for the UE to achieve the relevant functions in the MF mode because the E-UTRA capability information does not include the capability indication information related to the MF mode.

In a possible embodiment of the present disclosure, the indication module 502 includes: a first indication sub-module configured to indicate the frequency band of the MF mode supported by the UE in a RF parameter contained in E-UTRA capability information of the UE capability information, and/or a second indication sub-module configured to indicate the function feature of the MF mode supported by the UE in an FGI parameter contained in the E-UTRA capability information of the UE capability information, the function feature of the MF mode including an inter-frequency measurement function feature and an inter-frequency intra handover function feature of an MF mode.

In a possible embodiment of the present disclosure, the first indication sub-module includes: a first indication unit configured to, when a frequency band number used in the MF mode is same as a frequency band number used in an LAA mode, indicate the frequency band of the MF mode supported by the UE in the RF parameter contained in the E-UTRA capability information of the UE capability information using the frequency band number and a network type, the network type including the MF mode and/or the LAA mode; and a second indication unit configured to, when a frequency band number used in the MF mode is different from a frequency band number used in the LAA mode, indicate the frequency band of the in MF mode supported by the UE in the RF parameter contained in the E-UTRA capability information of the UE capability information using the frequency band number.

In a possible embodiment of the present disclosure, the second indication sub-module includes a third indication unit configured to indicate the inter-frequency measurement function feature of the MF mode supported by the UE in the FGI parameter contained in the E-UTRA capability information of the UE capability information using bit information indicating the inter-frequency measurement function feature and/or bit information in a predetermined idle state. The inter-frequency measurement function feature of the MF mode includes an inter-frequency measurement function feature of the MF mode, an inter-frequency measurement function feature between the MF mode and a TDD mode, or an inter-frequency measurement function feature between the MF mode and an FDD mode.

In a possible embodiment of the present disclosure, the third indication unit is further configured to, in the FGI parameter contained in the E-UTRA capability information of the UE capability information, indicate the inter-frequency measurement function feature of the MF mode using first bit information in the predetermined idle state, indicate the inter-frequency measurement function feature between the MF mode and the TDD mode supported by the UE using second bit information in the predetermined idle state, and indicate the inter-frequency measurement function feature between the MF mode and the FDD mode supported by the UE using third bit information in the predetermined idle state.

In a possible embodiment of the present disclosure, the third indication unit is further configured to, in the FGI parameter contained in the E-UTRA capability information of the UE capability information, indicate the inter-frequency measurement function feature of the MF mode using the bit information indicating the inter-frequency measurement function feature, indicate the inter-frequency measurement function feature between the MF mode and the TDD mode supported by the UE using second bit information in the predetermined idle state, and indicate the inter-frequency measurement function feature between the MF mode and the FDD mode supported by the UE using third bit information in the predetermined idle state.

In a possible embodiment of the present disclosure, the third indication unit is further configured to, in the FGI parameter contained in the E-UTRA capability information of the UE capability information, indicate the inter-frequency measurement function feature of the MF mode supported by the UE and the inter-frequency measurement function feature of the TDD or FDD mode supported by the UE in the MF mode using the bit information indicating the inter-frequency measurement function feature, and indicate an inter-frequency measurement function feature of the MF mode supported by the UE in the TDD or FDD mode using third bit information in the predetermined idle state.

In a possible embodiment of the present disclosure, the third indication unit is further configured to, in the FGI parameter contained in the E-UTRA capability information of the UE capability information, indicate the inter-frequency measurement function feature of the MF mode supported by the UE using the bit information indicating the inter-frequency measurement function feature, and indicate the inter-frequency measurement function feature between the MF mode and the TDD or FDD mode supported by the UE using third bit information in the predetermined idle state.

In a possible embodiment of the present disclosure, the third indication unit is further configured to, in the FGI parameter contained in the E-UTRA capability information of the UE capability information, indicate the inter-frequency measurement function feature of the MF mode supported by the UE and the inter-frequency measurement function feature between the MF mode and the TDD mode supported by the UE using the bit information indicating the inter-frequency measurement function feature, and indicate the inter-frequency measurement function feature between the MF mode and the FDD mode supported by the UE using third bit information in the predetermined idle state.

In a possible embodiment of the present disclosure, the third indication unit is further configured to, in the FGI parameter contained in the E-UTRA capability information of the UE capability information, indicate the inter-frequency measurement function feature of the MF mode supported by the UE and the inter-frequency measurement function feature between the MF mode and the FDD mode supported by the UE using the bit information indicating the inter-frequency measurement function feature, and indicate the inter-frequency measurement function feature between the MF mode and the TDD mode supported by the UE using third bit information in the predetermined idle state.

In a possible embodiment of the present disclosure, the third indication unit is further configured to, in the FGI parameter contained in the E-UTRA capability information of the UE capability information, indicate the inter-frequency measurement function feature of the MF mode supported by the UE and the inter-frequency measurement function feature between the MF mode and the TDD or FDD mode using the bit information indicating the inter-frequency measurement function feature.

In a possible embodiment of the present disclosure, the second indication sub-module includes a fourth indication unit configured to indicate the inter-frequency intra handover function feature of the MF mode supported by the UE in the FGI parameter contained in the E-UTRA capability information of the UE capability information using bit information indicating the inter-frequency handover function feature and/or bit information in a predetermined idle state. The bit information indicating the inter-frequency handover function feature includes bit information indicating an inter-frequency handover function feature within a mode and bit information indicating an inter-frequency handover function feature between different modes. The inter-frequency intra handover function feature of the MF mode includes an inter-frequency intra handover function feature of the MF mode, and an inter-frequency handover function feature between the MF mode and the TDD or FDD mode.

In a possible embodiment of the present disclosure, the fourth indication unit is further configured to, in the FGI parameter contained in the E-UTRA capability information of the UE capability information, indicate the inter-frequency intra handover function feature of the MF mode supported by the UE using fourth bit information in the predetermined idle state, indicate the inter-frequency handover function feature between the MF mode and the TDD mode supported by the UE using fifth bit information in the predetermined idle state, and indicate the inter-frequency handover function feature between the MF mode and the FDD mode supported by the UE using sixth bit information in the predetermined idle state.

In a possible embodiment of the present disclosure, the fourth indication unit is further configured to, in the FGI parameter contained in the E-UTRA capability information of the UE capability information, indicate the inter-frequency intra handover function feature of the MF mode supported by the UE using the bit information indicating the inter-frequency handover function feature within a mode, indicate the inter-frequency handover function feature between the MF mode and the TDD mode supported by the UE using fifth bit information in the predetermined idle state, and indicate the inter-frequency handover function feature between the MF mode and the FDD mode supported by the UE using sixth bit information in the predetermined idle state.

In a possible embodiment of the present disclosure, the fourth indication unit is further configured to, in the FGI parameter contained in the E-UTRA capability information of the UE capability information, indicate the inter-frequency intra handover function feature of the MF mode supported by the UE using the bit information indicating the inter-frequency handover function feature within a mode, indicate an inter-frequency handover function feature about the handover from the MF mode to the TDD or FDD mode supported by the UE using the bit information indicating the inter-frequency handover function feature between the modes, and indicate an inter-frequency handover function feature about the handover from the TDD or FDD mode to the MF mode supported by the UE using sixth bit information in the predetermined idle state.

In a possible embodiment of the present disclosure, the fourth indication unit is further configured to, in the FGI parameter contained in the E-UTRA capability information of the UE capability information, indicate the inter-frequency intra handover function feature of the MF mode supported by the UE using the bit information indicating the inter-frequency handover function feature within a mode, and indicate the inter-frequency handover function feature between the MF mode and the TDD or FDD mode supported by the UE using sixth bit information in the predetermined idle state.

In a possible embodiment of the present disclosure, the fourth indication unit is further configured to, in the FGI parameter contained in the E-UTRA capability information of the UE capability information, indicate the inter-frequency intra handover function feature of the MF mode supported by the UE using the bit information indicating the inter-frequency handover function feature within a mode, indicate the inter-frequency handover function feature between the MF mode and the TDD mode supported by the UE using the bit information indicating the inter-frequency handover function feature between the modes, and indicate the inter-frequency handover function feature between the MF mode and the FDD mode supported by the UE using sixth bit information in the predetermined idle state.

In a possible embodiment of the present disclosure, the fourth indication unit is further configured to, in the FGI parameter contained in the E-UTRA capability information of the UE capability information, indicate the inter-frequency intra handover function feature of the MF mode supported by the UE using the bit information indicating the inter-frequency handover function feature within a mode, indicate the inter-frequency handover function feature between the MF mode and the TDD mode supported by the UE using the bit information indicating the inter-frequency handover function feature between the modes, and indicate the inter-frequency handover function feature between the MF mode and the TDD mode supported by the UE using sixth bit information in the predetermined idle state.

In a possible embodiment of the present disclosure, the fourth indication unit is further configured to, in the FGI parameter contained in the E-UTRA capability information of the UE capability information, indicate the inter-frequency intra handover function feature of the MF mode supported by the UE using the bit information indicating the inter-frequency handover function feature within a mode, and indicate the inter-frequency handover function feature between the MF mode and the TDD or FDD mode supported by the UE using the bit information indicating the inter-frequency handover function feature between the modes.

According to the device in this embodiment of the present disclosure, the UE may indicate the frequency band of the MF mode supported by the UE in the RF parameter contained in the E-UTRA capability information, and indicate the function feature of the MF mode supported by the UE in the FGI parameter contained in the E-UTRA capability information, so as to indicate the capability of the MF mode supported by the UE and enable the UE to achieve the relevant functions in the MF mode. In addition, it is able to prevent the additional FGI bits from being occupied in the MF mode, and reduce the number of the occupied FGI bits in the idle state. As a result, it is able to solve the problem in the related art where it is impossible for the UE to achieve the relevant functions in the MF mode because the E-UTRA capability information does not include the capability indication information related to the MF mode.

It should be appreciated that, the device for indicating the UE capability is a device corresponding to the above-mentioned method for indicating the UE capability. All implementations in the above embodiment may be applied to the device implementation with a same technical effect.

Sixth Embodiment

Figure 6:
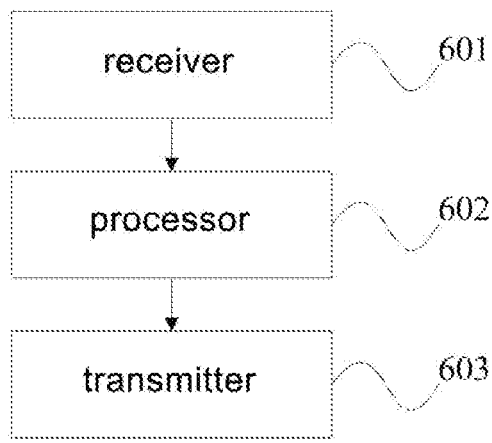
FIG. 6 is a schematic view showing a UE according to some embodiments of the present disclosure.

As shown in FIG. 6, the present disclosure provides in this embodiment a UE, which includes: a receiver 601 configured to receive from a base station a request message for acquiring a UE capability; a processor 602 configured to indicate a capability of an MF mode supported by the UE in UE capability information, the capability of the MF mode supported by the UE including a frequency band and/or a function feature of the MF mode supported by the UE; and a transmitter 603 configured to transmit the UE capability information to the base station.

The processor 602 may be further configured to achieve the functions of all the modules in the above-mentioned embodiment with a same technical effect.

In some embodiments of the present disclosure, the processor 602, the receiver 601 and the transmitter 603 may be coupled together via a bus system including a power source bus, a control bus and a state signal bus, apart from a data bus. The processor 602 may be an Integrated Circuit (IC) having a signal processing capability. The processor 602 may be a general-purpose processor, including a Central Processing Unit (CPU), a Network Processor (NP), a Digital Signal Processor (DSP), an Application Specific Integrated Circuit (ASIC), a Field Programmable Gate Array (FPGA), or any other programmable logic element, discrete gate or transistor logic element, or discrete hardware assembly, so as to implement or execute the method, the steps and the procedures. The general-purpose processor may be a microprocessor or any other conventional processor. The UE in the embodiments of the present disclosure may be a mobile telephone (or mobile phone), or any other device capable of transmitting or receiving a wireless signal, including a terminal, a Personal Digital Assistant (PDA), a wireless modem, a wireless communication device, a handheld device, a lap-top computer, a cordless telephone, a Wireless Local Loop (WLL) station, a Central Processing Element or a Mobile WIFI (MiFi) capable of converting a mobile signal into a WiFi signal, an intelligent household electrical appliance, or any other device capable of communicating with a mobile communication network voluntarily without being operated by a person.

Seventh Embodiment

Figure 7:
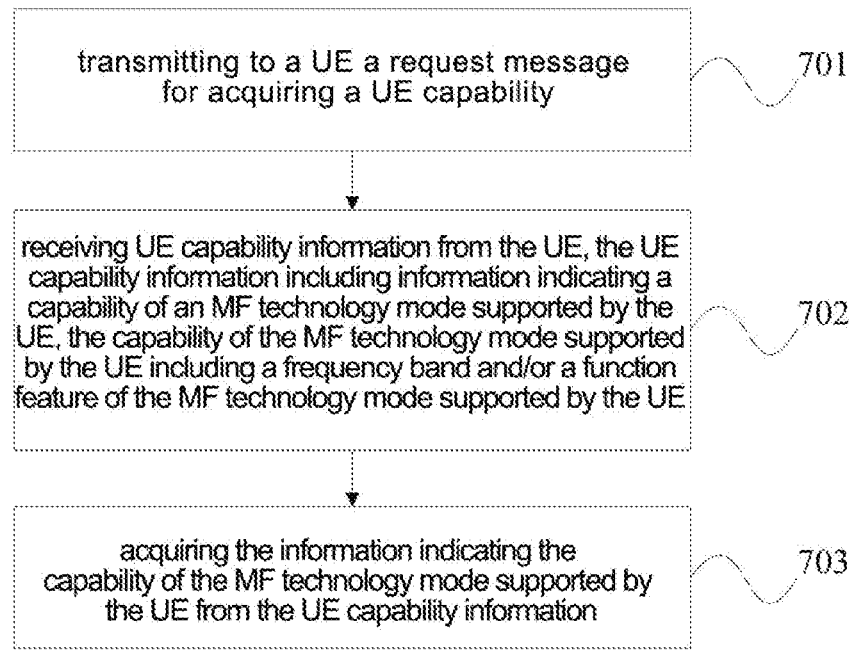
FIG. 7 is a flow chart of a method for indicating a UE capability according to some embodiments of the present disclosure.

As shown in FIG. 7, the present disclosure provides in this embodiment a method for indicating a UE capability for use in a base station which includes: Step 701 of transmitting to a UE a request message for acquiring the UE capability; Step 702 of receiving UE capability information from the UE, the UE capability information including information indicating a capability of an MF mode supported by the UE, the capability of the MF mode supported by the UE including a frequency band and/or a function feature of the MF mode supported by the UE; and Step 703 of acquiring the information indicating the capability of the MF mode supported by the UE from the UE capability information.

Here, the base station may receive the UE capability information indicating the capability of the MF mode supported by the UE, so as to support the relevant functions in the MF mode.

In a possible embodiment of the present disclosure, in Step 703, the frequency band of the MF mode supported by the UE may be acquired from a RF parameter contained in E-UTRA capability information of the UE capability information, or the function feature of the MF mode supported by the UE may be acquired from an FGI parameter contained in the E-UTRA capability information of the UE capability information. The function feature of the MF mode includes an inter-frequency measurement function feature of the MF mode and an inter-frequency intra handover function feature of the MF mode. The implementation of Step 703 may refer to those mentioned in FIGS. 1 to 6, and thus will not be particularly defined herein.

According to the method in this embodiment of the present disclosure, it is able to indicate the capability of the MF mode supported by the UE and enable the UE to achieve the relevant functions in the MF mode, thereby to solve the problem in the related art where it is impossible for the UE to achieve the relevant functions in the MF mode because the E-UTRA capability information does not include the capability indication information related to the MF mode.

Eighth Embodiment

Figure 8:
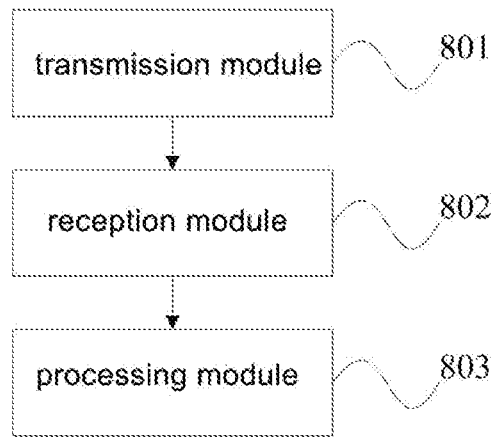
FIG. 8 is a schematic view showing a device for indicating a UE capability for use in a base station according to some embodiments of the present disclosure.

As shown in FIG. 8, the present disclosure provides in this embodiment a device for indicating a UE capability for use in a base station, which includes: a transmission module 801 configured to transmit to a UE a request message for acquiring the UE capability; a reception module 802 configured to receive UE capability information from the UE, the UE capability information including information indicating a capability of an MF mode supported by the UE, the capability of the MF mode supported by the UE including a frequency band and/or a function feature of the MF mode supported by the UE; and a processing module 803 configured to acquire the information indicating the capability of the MF mode in supported by the UE from the UE capability information.

In a possible embodiment of the present disclosure, the processing module 803 is further configured to acquire the frequency band of the MF mode supported by the UE from a RF parameter contained in E-UTRA capability information of the UE capability information, and/or acquire the function feature of the MF mode supported by the UE from an FGI parameter contained in the E-UTRA capability information of the UE capability information, the function feature of the MF mode including an inter-frequency measurement function feature and an inter-frequency intra handover function feature of the MF mode.

According to the device in this embodiment of the present disclosure, it is able to indicate the capability of the MF mode supported by the UE and enable the UE to achieve the relevant functions in the MF mode, thereby to solve the problem in the related art where it is impossible for the UE to achieve the relevant functions in the MF mode because the E-UTRA capability information does not include the capability indication information related to the MF mode.

It should be appreciated that, the device for indicating the UE capability is a device corresponding to the above-mentioned method for indicating the UE capability. All implementation modes in the above embodiment may be applied to the device implementation with a same technical effect.

Ninth Embodiment

Figure 9:
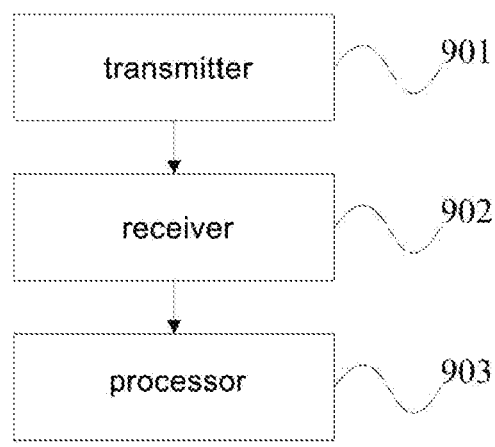
FIG. 9 is a schematic view showing the base station according to some embodiments of the present disclosure.

As shown in FIG. 9, the present disclosure provides in this embodiment a base station, which includes: a transmitter 901 configured to transmit to a UE a request message for acquiring a UE capability; a receiver 902 configured to receive UE capability information from the UE, the UE capability information including information indicating a capability of an MF mode supported by the UE, the capability of the MF mode supported by the UE including a frequency band and/or a function feature of the MF mode supported by the UE; and a processor 903 configured to acquire the information indicating the capability of the MF mode supported by the UE from the UE capability information.

The processor 903 may be further configured to achieve the functions of all the modules in the above-mentioned embodiment with a same technical effect.

It should be further appreciated that, serial numbers of the steps are not used to represent an order of the steps. In other words, the order of the steps shall be determined in accordance with their functions as well as inherent logic relationship, but shall not be used to define the implementation thereof in any form.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

A1. A method for indicating a UE capability for use in a UE, including steps of: receiving from a base station a request message for acquiring the UE capability; indicating a capability of an MF mode supported by the UE in UE capability information, the capability of the MF mode supported by the UE including a frequency band and/or a function feature of the MF mode supported by the UE; and transmitting the UE capability information to the base station.

A2. The method according to claim A1, wherein the step of indicating the capability of the MF mode supported by the UE in the UE capability information includes: indicating the frequency band of the MF mode supported by the UE in a RF parameter contained in E-UTRA capability information of the UE capability information; and/or indicating the function feature of the MF mode supported by the UE in an FGI parameter contained in the E-UTRA capability information of the UE capability information, the function feature of the MF mode including a measurement function feature and an intra handover function feature of the MF mode.

A3. The method according to claim A2, wherein the step of indicating the frequency band of the MF mode supported by the UE in the RF parameter contained in the E-UTRA capability information of the UE capability information includes: when a frequency band number used in the MF mode is same as a frequency band number used in an LAA mode, indicating the frequency band of the MF mode to supported by the UE in the RF parameter contained in the E-UTRA capability information of the UE capability information using the frequency band number and a network type, the network type including the MF mode and/or the LAA mode; and when a frequency band number used in the MF mode is different from a frequency band number used in the LAA mode, indicating the frequency band of the MF mode supported by the UE in the RF parameter contained in the E-UTRA capability information of the UE capability information using the frequency band number.

A4. The method according to claim A2, wherein the step of indicating the function feature of the MF mode supported by the UE in the FGI parameter contained in the E-UTRA capability information of the UE capability information includes indicating the intra measurement function feature of the MF mode supported by the UE in the FGI parameter contained in the E-UTRA capability information of the UE capability information using bit information indicating the measurement function feature and/or bit information in a predetermined idle state, wherein the intra measurement function feature of the MF mode includes an intra measurement function feature of the MF mode, a measurement function feature between the MF mode and a TDD mode, or a measurement function feature between the MF mode and an FDD mode.

A5. The method according to claim A4, wherein the step of indicating the intra measurement function feature of the MF mode supported by the UE in the FGI parameter contained in the E-UTRA capability information of the UE capability information using the bit information indicating the measurement function feature and/or the bit information in the predetermined idle state includes, in the FGI parameter contained in the E-UTRA capability information of the UE capability information, indicating the intra measurement function feature of the MF mode using first bit information in the predetermined idle state, indicating the measurement function feature between the MF mode and the TDD mode supported by the UE using second bit information in the predetermined idle state, and indicating the measurement function feature between the MF mode and the FDD mode supported by the UE using third bit information in the predetermined idle state.

A6. The method according to claim A4, wherein the step of indicating the intra measurement function feature of the MF mode supported by the UE in the FGI parameter contained in the E-UTRA capability information of the UE capability information using the bit information indicating the measurement function feature and/or the bit information in the predetermined idle state includes, in the FGI parameter contained in the E-UTRA capability information of the UE capability information, indicating the intra measurement function feature of the MF mode using the bit information indicating the measurement function feature, indicating the measurement function feature between the MF mode and the TDD mode supported by the UE using second bit information in the predetermined idle state, and indicating the measurement function feature between the MF mode and the FDD mode supported by the UE using third bit information in the predetermined idle state.

A7. The method according to claim A4, wherein the step of indicating the intra measurement function feature of the MF mode supported by the UE in the FGI parameter contained in the E-UTRA capability information of the UE capability information using the bit information indicating the measurement function feature and/or the bit information in the predetermined idle state includes, in the FGI parameter contained in the E-UTRA capability information of the UE capability information, indicating the intra measurement function feature of the MF mode supported by the UE and the measurement function feature of the TDD or FDD mode supported by the UE in the MF mode using the bit information indicating the measurement function feature, and indicating an intra measurement function feature of the MF mode supported by the UE in the TDD or FDD mode using third bit information in the predetermined idle state.

A8. The method according to claim A4, wherein the step of indicating the intra measurement function feature of the MF mode supported by the UE in the FGI parameter contained in the E-UTRA capability information of the UE capability information using the bit information indicating the measurement function feature and/or the bit information in the predetermined idle state includes, in the FGI parameter contained in the E-UTRA capability information of the UE capability information, indicating the intra measurement function feature of the MF mode supported by the UE using the bit information indicating the measurement function feature, and indicating the measurement function feature between the MF mode and the TDD or FDD mode supported by the UE using third bit information in the predetermined idle state.

A9. The method according to claim A4, wherein the step of indicating the intra measurement function feature of the MF mode supported by the UE in the FGI parameter contained in the E-UTRA capability information of the UE capability information using the bit information indicating the measurement function feature and/or the bit information in the predetermined idle state includes, in the FGI parameter contained in the E-UTRA capability information of the UE capability information, indicating the intra measurement function feature of the MF mode supported by the UE and the measurement function feature between the MF mode and the TDD mode supported by the UE using the bit information indicating the measurement function feature, and indicating the measurement function feature between the MF mode and the FDD mode supported by the UE using third bit information in the predetermined idle state.

A10. The method according to claim A4, wherein the step of indicating the intra measurement function feature of the MF mode supported by the UE in the FGI parameter contained in the E-UTRA capability information of the UE capability information using the bit information indicating the measurement function feature and/or the bit information in the predetermined idle state includes, in the FGI parameter contained in the E-UTRA capability information of the UE capability information, indicating the intra measurement function feature of the MF mode supported by the UE and the measurement function feature between the MF mode and the FDD mode supported by the UE using the bit information indicating the measurement function feature, and indicating the measurement function feature between the MF mode and the TDD mode supported by the UE using third bit information in the predetermined idle state.

A11. The method according to claim A4, wherein the step of indicating the intra measurement function feature of the MF mode supported by the UE in the FGI parameter contained in the E-UTRA capability information of the UE capability information using the bit information indicating the measurement function feature and/or the bit information in the predetermined idle state includes, in the FGI parameter contained in the E-UTRA capability information of the UE capability information, indicating the intra measurement function feature of the MF mode supported by the UE and the measurement function feature between the MF mode and the TDD or FDD mode using the bit information indicating the measurement function feature.

A12. The method according to any one of claims A2 to A11, wherein the step of indicating the function feature of the MF mode supported by the UE in the FGI parameter contained in the E-UTRA capability information of the UE capability information includes indicating the intra handover function feature of the MF mode supported by the UE in the FGI parameter contained in the E-UTRA capability information of the UE capability information using bit information indicating the handover function feature and/or bit information in a predetermined idle state, wherein the bit information indicating the handover function feature includes bit information indicating a handover function feature within a mode and bit information indicating a handover function feature between different modes, and the intra handover function feature of the MF mode includes an intra handover function feature of the MF mode, and a handover function feature between the MF mode and the TDD or FDD mode.

A13. The method according to claim A12, wherein the step of indicating the intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intra handover function feature of the MF mode supported by the UE using fourth bit information in the predetermined idle state, indicating the handover function feature between the MF mode and the TDD mode supported by the UE using fifth bit information in the predetermined idle state, and indicating the handover function feature between the MF mode and the FDD mode supported by the UE using sixth bit information in the predetermined idle state.

A14. The method according to claim A12, wherein the step of indicating the intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intra handover function feature of the MF mode supported by the UE using the bit information indicating the handover function feature within a mode, indicating the handover function feature between the MF mode and the TDD mode supported by the UE using fifth bit information in the predetermined idle state, and indicating the handover function feature between the MF mode and the FDD mode supported by the UE using sixth bit information in the predetermined idle state.

A15. The method according to claim A12, wherein the step of indicating the intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intra handover function feature of the MF mode supported by the UE using the bit information indicating the handover function feature within a mode, indicating a handover function feature about the handover from the MF mode to the TDD or FDD mode supported by the UE using the bit information indicating the handover function feature between the modes, and indicating a handover function feature about the handover from the TDD or FDD mode to the MF mode supported by the UE using sixth bit information in the predetermined idle state.

A16. The method according to claim A12, wherein the step of indicating the intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intra handover function feature of the MF mode supported by the UE using the bit information indicating the handover function feature within a mode, and indicating the handover function feature between the MF mode and the TDD or FDD mode supported by the UE using sixth bit information in the predetermined idle state.

A17. The method according to claim A12, wherein the step of indicating the intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intra handover function feature of the MF mode supported by the UE using the bit information indicating the handover function feature within a mode, indicating the handover function feature between the MF mode and the TDD mode supported by the UE using the bit information indicating the handover function feature between the modes, and indicating the handover function feature between the MF mode and the FDD mode supported by the UE using sixth bit information in the predetermined idle state.

A18. The method according to claim A12, wherein the step of indicating the intran intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intran intra handover function feature of the MF mode supported by the UE using the bit information indicating the handover function feature within a mode, indicating the handover function feature between the MF mode and the FDD mode supported by the UE using the bit information indicating the handover function feature between the modes, and indicating the handover function feature between the MF mode and the TDD mode supported by the UE using sixth bit information in the predetermined idle state.

A19. The method according to claim A12, wherein the step of indicating the intran intra handover function feature of the MF mode supported by the UE in the FGI parameter contained in the E-UTRA capability information of the UE capability information using the bit information indicating the handover function feature and/or the bit information in the predetermined idle state includes, in the FGI parameter contained in the E-UTRA capability information of the UE capability information, indicating the intran intra handover function feature of the MF mode supported by the UE using the bit information indicating the handover function feature within a mode, and indicating the handover function feature between the MF mode and the TDD or FDD mode supported by the UE using the bit information indicating the handover function feature between the modes.

B20. A device for indicating a UE capability for use in a UE, including: a reception module configured to receive from a base station a request message for acquiring the UE capability; an indication module configured to indicate a capability of an MF mode supported by the UE in UE capability information, the capability of the MF mode supported by the UE including a frequency band and/or a function feature of the MF mode supported by the UE; and a transmission module configured to transmit the UE capability information to the base station.

B21. The device according to claim B20, wherein the indication module includes: a first indication sub-module configured to indicate the frequency band of the MF mode supported by the UE in a RF parameter contained in E-UTRA capability information of the UE capability information; and/or a second indication sub-module configured to indicate the function feature of the MF mode supported by the UE in an FGI parameter contained in the E-UTRA capability information of the UE capability information, the function feature of the MF mode including a measurement function feature and an intra intra handover function feature of the MF mode.

B22. The device according to claim B21, wherein the first indication sub-module includes: a first indication unit configured to, when a frequency band number used in the MF mode is same as a frequency band number used in an LAA mode, indicate the frequency band of the MF mode supported by the UE in the RF parameter contained in the E-UTRA capability information of the UE capability information using the frequency band number and a network type, the network type including the MF mode and/or the LAA mode; and a second indication unit configured to, when a frequency band number used in the MF mode is different from a frequency band number used in the LAA mode, indicate the frequency band of the MF mode supported by the UE in the RF parameter contained in the E-UTRA capability information of the UE capability information using the frequency band number.

B23. The device according to claim B21, wherein the second indication sub-module includes a third indication unit configured to indicate the intra measurement function feature of the MF mode supported by the UE in the FGI parameter contained in the E-UTRA capability information of the UE capability information using bit information indicating the measurement function feature and/or bit information in a predetermined idle state, wherein the intra measurement function feature of the MF mode includes an intra measurement function feature of the MF mode, a measurement function feature between the MF mode and a TDD mode, or a measurement function feature between the MF mode and an FDD mode.

B24. The device according to claim B23, wherein the third indication unit is further configured to, in the FGI parameter contained in the E-UTRA capability information of the UE capability information, indicate the intra measurement function feature of the MF mode using first bit information in the predetermined idle state, indicate the measurement function feature between the MF mode and the TDD mode supported by the UE using second bit information in the predetermined idle state, and indicate the measurement function feature between the MF mode and the FDD mode supported by the UE using third bit information in the predetermined idle state.

B25. The device according to claim B23, wherein the third indication unit is further configured to, in the FGI parameter contained in the E-UTRA capability information of the UE capability information, indicate the intra measurement function feature of the MF mode using the bit information indicating the measurement function feature, indicate the measurement function feature between the MF mode and the TDD mode supported by the UE using second bit information in the predetermined idle state, and indicate the measurement function feature between the MF mode and the FDD mode supported by the UE using third bit information in the predetermined idle state.

B26. The device according to claim B23, wherein the third indication unit is further configured to, in the FGI parameter contained in the E-UTRA capability information of the UE capability information, indicate the intra measurement function feature of the MF mode supported by the UE and the measurement function feature of the TDD or FDD mode supported by the UE in the MF mode using the bit information indicating the measurement function feature, and indicate an intra measurement function feature of the MF mode supported by the UE in the TDD or FDD mode using third bit information in the predetermined idle state.

B27. The device according to claim B23, wherein the third indication unit is further configured to, in the FGI parameter contained in the E-UTRA capability information of the UE capability information, indicate the intra measurement function feature of the MF mode supported by the UE using the bit information indicating the measurement function feature, and indicate the measurement function feature between the MF mode and the TDD or FDD mode supported by the UE using third bit information in the predetermined idle state.

B28. The device according to claim B23, wherein the third indication unit is further configured to, in the FGI parameter contained in the E-UTRA capability information of the UE capability information, indicate the intra measurement function feature of the MF mode supported by the UE and the measurement function feature to between the MF mode and the TDD mode supported by the UE using the bit information indicating the measurement function feature, and indicate the measurement function feature between the MF mode and the FDD mode supported by the UE using third bit information in the predetermined idle state.

B29. The device according to claim B23, wherein the third indication unit is further configured to, in the FGI parameter contained in the E-UTRA capability information of the UE capability information, indicate the intra measurement function feature of the MF mode supported by the UE and the measurement function feature between the MF mode and the FDD mode supported by the UE using the bit information indicating the measurement function feature, and indicate the measurement function feature between the MF mode and the TDD mode supported by the UE using third bit information in the predetermined idle state.

B30. The device according to claim B23, wherein the third indication unit is further configured to, in the FGI parameter contained in the E-UTRA capability information of the UE capability information, indicate the intra measurement function feature of the MF mode supported by the UE and the measurement function feature between the MF mode and the TDD or FDD mode using the bit information indicating the measurement function feature.

B31. The device according to any one of claims B21 to B30, wherein the second indication sub-module includes a fourth indication unit configured to indicate the intran intra handover function feature of the MF mode supported by the UE in the FGI parameter contained in the E-UTRA capability information of the UE capability information using bit information indicating the handover function feature and/or bit information in a predetermined idle state, wherein the bit information indicating the handover function feature includes bit information indicating a handover function feature within a mode and bit information indicating a handover function feature between different modes, and the intran intra handover function feature of the MF mode includes an intra intra handover function feature of the MF mode, and a handover function feature between the MF mode and the TDD or FDD mode.

B32. The device according to B31, wherein the fourth indication unit is further configured to, in the FGI parameter contained in the E-UTRA capability information of the UE capability information, indicate the intran intra handover function feature of the MF mode supported by the UE using fourth bit information in the predetermined idle state, indicate the handover function feature between the MF mode and the TDD mode supported by the UE using fifth bit information in the predetermined idle state, and indicate the handover function feature between the MF mode and the FDD mode supported by the UE using sixth bit information in the predetermined idle state.

B33. The device according to claim B31, wherein the fourth indication unit is further configured to, in the FGI parameter contained in the E-UTRA capability information of the UE capability information, indicate the intran intra handover function feature of the MF mode supported by the UE using the bit information indicating the handover function feature within a mode, indicate the handover function feature between the MF mode and the TDD mode supported by the UE using fifth bit information in the predetermined idle state, and indicate the handover function feature between the MF mode and the FDD mode supported by the UE using sixth bit information in the predetermined idle state.

B34. The device according to claim B31, wherein the fourth indication unit is further configured to, in the FGI parameter contained in the E-UTRA capability information of the UE capability information, indicate the intran intra handover function feature of the MF mode supported by the UE using the bit information indicating the handover function feature within a mode, indicate a handover function feature about the handover from the MF mode to the TDD or FDD mode supported by the UE using the bit information indicating the handover function feature between the modes, and indicate a handover function feature about the handover from the TDD or FDD mode to the MF mode supported by the UE using sixth bit information in the predetermined idle state.

B35. The device according to claim B31, wherein the fourth indication unit is further configured to, in the FGI parameter contained in the E-UTRA capability information of the UE capability information, indicate the intran intra handover function feature of the MF mode supported by the UE using the bit information indicating the handover function feature within a mode, and indicate the handover function feature between the MF mode and the TDD or FDD mode supported by the UE using sixth bit information in the predetermined idle state.

B36. The device according to B31, wherein the fourth indication unit is further configured to, in the FGI parameter contained in the E-UTRA capability information of the UE capability information, indicate the intran intra handover function feature of the MF mode supported by the UE using the bit information indicating the handover function feature within a mode, indicate the handover function feature between the MF mode and the TDD mode supported by the UE using the bit information indicating the handover function feature between the modes, and indicate the handover function feature between the MF mode and the FDD mode supported by the UE using sixth bit information in the predetermined idle state.

B37. The device according to claim B31, wherein the fourth indication unit is further configured to, in the FGI parameter contained in the E-UTRA capability information of the UE capability information, indicate the intran intra handover function feature of the MF mode supported by the UE using the bit information indicating the handover function feature within a mode, indicate the handover function feature between the MF mode and the FDD mode supported by the UE using the bit information indicating the handover function feature between the modes, and indicate the handover function feature between the MF mode and the TDD mode supported by the UE using sixth bit information in the predetermined idle state.

B38. The device according to claim B31, wherein the fourth indication unit is further configured to, in the FGI parameter contained in the E-UTRA capability information of the UE capability information, indicate the intran intra handover function feature of the MF mode supported by the UE using the bit information indicating the handover function feature within a mode, and indicate the handover function feature between the MF mode and the TDD or FDD mode supported by the UE using the bit information indicating the handover function feature between the modes.

C39. A UE, including: a receiver configured to receive from a base station a request message for acquiring a UE capability; a processor configured to indicate a capability of an MF mode supported by the UE in UE capability information, the capability of the MF mode supported by the UE including a frequency band and/or a function feature of the MF mode supported by the UE; and a transmitter configured to transmit the UE capability information to the base station.

D40. A method for indicating a UE capability for use in a base station, including steps of: transmitting to a UE a request message for acquiring the UE capability; receiving UE capability information from the UE, the UE capability information including information indicating a capability of an MF mode supported by the UE, the capability of the MF mode supported by the UE including a frequency band and/or a function feature of the MF mode supported by the UE; and acquiring the information indicating the capability of the MF mode supported by the UE from the UE capability information.

D41. The method according to claim D40, wherein the step of acquiring the information indicating the capability of the MF mode supported by the UE from the UE capability information includes: acquiring the frequency band of the MF mode supported by the UE from a RF parameter contained in E-UTRA capability information of the UE capability information; and/or acquiring the function feature of the MF mode supported by the UE from an FGI parameter contained in the E-UTRA capability information of the UE capability information, the function feature of the MF mode including a measurement function feature and an intra intra handover function feature of the MF mode.

E42. A device for indicating a UE capability for use in a base station, including: a transmission module configured to transmit to a UE a request message for acquiring the UE capability; a reception module configured to receive UE capability information from the UE, the UE capability information including information indicating a capability of an MF mode supported by the UE, the capability of the MF mode supported by the UE including a frequency band and/or a function feature of the in MF mode supported by the UE; and a processing module configured to acquire the information indicating the capability of the MF mode supported by the UE from the UE capability information.

E43. The device according to claim E42, wherein the processing module is further configured to acquire the frequency band of the MF mode supported by the UE from a RF parameter contained in E-UTRA capability information of the UE capability information, and/or acquire the function feature of the MF mode supported by the UE from an FGI parameter contained in the E-UTRA capability information of the UE capability information, the function feature of the MF mode including a measurement function feature and an intra intra handover function feature of the MF mode.

F44. A base station, including: a transmitter configured to transmit to a UE a request message for acquiring a UE capability; a receiver configured to receive UE capability information from the UE, the UE capability information including information indicating a capability of an MF mode supported by the UE, the capability of the MF mode supported by the UE including a frequency band and/or a function feature of the MF mode supported by the UE; and a processor configured to acquire the information indicating the capability of the MF mode supported by the UE from the UE capability information.

What is claimed is:

1. A method for indicating a User Equipment (UE) capability for use in a UE, comprising steps of:
   receiving from a base station a request message for acquiring the UE capability;
   indicating a capability of a MulteFire (MF) mode supported by the UE in UE capability information, the capability of the MF mode supported by the UE comprising a frequency band and/or a function feature of the MF mode supported by the UE; and
   transmitting the UE capability information to the base station;
      wherein the indicating the capability of the MF mode supported by the UE in the UE capability information comprises:
      indicating the frequency band of the MF mode supported by the UE in a Radio Frequency (RF) parameter contained in Evolved Universal Terrestrial Radio Access (E-UTRA) capability information of the UE capability information; and/or
      indicating the function feature of the MF mode supported by the UE in a Function Group Indicator (FGI) parameter contained in the E-UTRA capability information of the UE capability information, the function feature of the MF mode comprising a measurement function feature and an intran intra handover function feature of the MF mode;
      wherein the indicating the frequency band of the MF mode supported by the UE in the RF parameter contained in the E-UTRA capability information of the UE capability information comprises:
      when a frequency band number used in the MF mode is same as a frequency band number used in a Licensed Assistant Access (LAA) mode, indicating the frequency band of the MF mode supported by the UE in the RF parameter contained in the E-UTRA capability information of the UE capability information using the frequency band number and a network type, the network type comprising the MF mode and/or the LAA mode; and
      when a frequency band number used in the MF mode is different from a frequency band number used in the LAA mode, indicating the frequency band of the MF mode supported by the UE in the RF parameter contained in the E-UTRA capability information of the UE capability information using the frequency band number.

2. The method according to claim 1, wherein the step of indicating the function feature of the MF mode supported by the UE in the FGI parameter contained in the E-UTRA capability information of the UE capability information comprises indicating the intra measurement function feature of the MF mode supported by the UE in the FGI parameter contained in the E-UTRA capability information of the UE capability information using bit information indicating the measurement function feature and/or bit information in a predetermined idle state,
   wherein the intra measurement function feature of the MF mode comprises an intra measurement function feature of the MF mode, a measurement function feature between the MF mode and a Time Division Duplexing (TDD) mode, or a measurement function feature between the MF mode and a Frequency Division Duplexing (FDD) mode.

3. The method according to claim 2, wherein the step of indicating the intra measurement function feature of the MF mode supported by the UE in the FGI parameter contained in the E-UTRA capability information of the UE capability information using the bit information indicating the measurement function feature and/or the bit information in the predetermined idle state comprises, in the FGI parameter contained in the E-UTRA capability information of the UE capability information, indicating the intra measurement function feature of the MF mode using the bit information indicating the measurement function feature, indicating the measurement function feature between the MF mode and the TDD mode supported by the UE using second bit information in the predetermined idle state, and indicating the measurement function feature between the MF mode and the FDD mode supported by the UE using third bit information in the predetermined idle state.

4. The method according to claim 2, wherein the step of indicating the intra measurement function feature of the MF mode supported by the UE in the FGI parameter contained in the E-UTRA capability information of the UE capability information using the bit information indicating the measurement function feature and/or the bit information in the predetermined idle state comprises, in the FGI parameter contained in the E-UTRA capability information of the UE capability information, indicating the intra measurement function feature of the MF mode supported by the UE using the bit information indicating the measurement function feature, and indicating the measurement function feature between the MF mode and the TDD or FDD mode supported by the UE using third bit information in the predetermined idle state.

5. The method according to claim 2, wherein the step of indicating the intra measurement function feature of the MF mode supported by the UE in the FGI parameter contained in the E-UTRA capability information of the UE capability information using the bit information indicating the measurement function feature and/or the bit information in the predetermined idle state comprises, in the FGI parameter contained in the E-UTRA capability information of the UE capability information, indicating the intra measurement function feature of the MF mode supported by the UE and the measurement function feature between the MF mode and the TDD mode supported by the UE using the bit information indicating the measurement function feature, and indicating the measurement function feature between the MF mode and the FDD mode supported by the UE using third bit information in the predetermined idle state.

6. The method according to claim 2, wherein the step of indicating the intra measurement function feature of the MF mode supported by the UE in the FGI parameter contained in the E-UTRA capability information of the UE capability information using the bit information indicating the measurement function feature and/or the bit information in the predetermined idle state comprises, in the FGI parameter contained in the E-UTRA capability information of the UE capability information, indicating the intra measurement function feature of the MF mode supported by the UE and the measurement function feature between the MF mode and the FDD mode supported by the UE using the bit information indicating the measurement function feature, and indicating the measurement function feature between the MF mode and the TDD mode supported by the UE using third bit information in the predetermined idle state.

7. The method according to claim 2, wherein the step of indicating the intra measurement function feature of the MF mode supported by the UE in the FGI parameter contained in the E-UTRA capability information of the UE capability information using the bit information indicating the measurement function feature and/or the bit information in the predetermined idle state comprises, in the FGI parameter contained in the E-UTRA capability information of the UE capability information, indicating the intra measurement function feature of the MF mode supported by the UE and the measurement function feature between the MF mode and the TDD or FDD mode using the bit information indicating the measurement function feature.

8. The method according to claim 1, wherein the step of indicating the function feature of the MF mode supported by the UE in the FGI parameter contained in the E-UTRA capability information of the UE capability information comprises indicating the intran intra handover function feature of the MF mode supported by the UE in the FGI parameter contained in the E-UTRA capability information of the UE capability information using bit information indicating the handover function feature and/or bit information in a predetermined idle state, wherein the bit information indicating the handover function feature comprises bit information indicating a handover function feature within a mode and bit information indicating a handover function feature between different modes, and the intran intra handover function feature of the MF mode comprises an intra intra handover function feature of the MF mode, and a handover function feature between the MF mode and the TDD or FDD mode.

9. The method according to claim 8, wherein the step of indicating the intran intra handover function feature of the MF mode supported by the UE in the FGI parameter contained in the E-UTRA capability information of the UE capability information using the bit information indicating the handover function feature and/or the bit information in the predetermined idle state comprises, in the FGI parameter contained in the E-UTRA capability information of the UE capability information, indicating the intran intra handover function feature of the MF mode supported by the UE using the bit information indicating the handover function feature within a mode, indicating the handover function feature between the MF mode and the TDD mode supported by the UE using fifth bit information in the predetermined idle state, and indicating the handover function feature between the MF mode and the FDD mode supported by the UE using sixth bit information in the predetermined idle state.

10. The method according to claim 8, wherein the step of indicating the intran intra handover function feature of the MF mode supported by the UE in the FGI parameter contained in the E-UTRA capability information of the UE capability information using the bit information indicating the handover function feature and/or the bit information in the predetermined idle state comprises, in the FGI parameter contained in the E-UTRA capability information of the UE capability information, indicating the intran intra handover function feature of the MF mode supported by the UE using the bit information indicating the handover function feature within a mode, and indicating the handover function feature between the MF mode and the TDD or FDD mode supported by the UE using sixth bit information in the predetermined idle state.

11. The method according to claim 8, wherein the step of indicating the intran intra handover function feature of the MF mode supported by the UE in the FGI parameter contained in the E-UTRA capability information of the UE capability information using the bit information indicating the handover function feature and/or the bit information in the predetermined idle state comprises, in the FGI parameter contained in the E-UTRA capability information of the UE capability information, indicating the intran intra handover function feature of the MF mode supported by the UE using the bit information indicating the handover function feature within a mode, indicating the handover function feature between the MF mode and the TDD mode supported by the UE using the bit information indicating the handover function feature between the modes, and indicating the handover function feature between the MF mode and the FDD mode supported by the UE using sixth bit information in the predetermined idle state.

12. The method according to claim 8, wherein the step of indicating the intran intra handover function feature of the MF mode supported by the UE in the FGI parameter contained in the E-UTRA capability information of the UE capability information using the bit information indicating the handover function feature and/or the bit information in the predetermined idle state comprises, in the FGI parameter contained in the E-UTRA capability information of the UE capability information, indicating the intran intra handover function feature of the MF mode supported by the UE using the bit information indicating the handover function feature within a mode, indicating the handover function feature between the MF mode and the FDD mode supported by the UE using the bit information indicating the handover function feature between the modes, and indicating the handover function feature between the MF mode and the TDD mode supported by the UE using sixth bit information in the predetermined idle state.

13. The method according to claim 8, wherein the step of indicating the intran intra handover function feature of the MF mode supported by the UE in the FGI parameter contained in the E-UTRA capability information of the UE capability information using the bit information indicating the handover function feature and/or the bit information in the predetermined idle state comprises, in the FGI parameter contained in the E-UTRA capability information of the UE capability information, indicating the intran intra handover function feature of the MF mode supported by the UE using the bit information indicating the handover function feature within a mode, and indicating the handover function feature between the MF mode and the TDD or FDD mode supported by the UE using the bit information indicating the handover function feature between the modes.

14. A User Equipment (UE), comprising:
a receiver configured to receive from a base station a request message for acquiring a UE capability;
a processor configured to indicate a capability of a MulteFire (MF) mode supported by the UE in UE capability information, the capability of the MF mode supported by the UE comprising a frequency band and/or a function feature of the MF mode supported by the UE; and
a transmitter configured to transmit the UE capability information to the base station;
wherein the processor is configured to indicate the frequency band of the MF mode supported by the UE in a Radio Frequency (RF) parameter contained in Evolved Universal Terrestrial Radio Access (E-UTRA) capability information of the UE capability information; and/or
the processor is configured to indicate the function feature of the MF mode supported by the UE in a Function Group Indicator (FGI) parameter contained in the E-UTRA capability information of the UE capability information, the function feature of the MF mode comprising a measurement function feature and an intran intra handover function feature of the MF mode;
wherein when a frequency band number used in the MF mode is same as a frequency band number used in a Licensed Assistant Access (LAA) mode, the processor is configured to indicate the frequency band of the MF mode supported by the UE in the RF parameter contained in the E-UTRA capability information of the UE capability information using the frequency band number and a network type, the network type comprising the MF mode and/or the LAA mode; and
when a frequency band number used in the MF mode is different from a frequency band number used in the LAA mode, the processor is configured to indicate the frequency band of the MF mode supported by the UE in the RF parameter contained in the E-UTRA capability information of the UE capability information using the frequency band number.

15. A method for indicating a User Equipment (UE) capability for use in a base station, comprising steps of:
transmitting to a UE a request message for acquiring the UE capability;
receiving UE capability information from the UE, the UE capability information comprising information indicating a capability of a MulteFire (MF) mode supported by the UE, the capability of the MF mode supported by the UE comprising a frequency band and/or a function feature of the MF mode supported by the UE; and
acquiring the information indicating the capability of the MF mode supported by the UE from the UE capability information;
wherein the receiving the capability of the MF mode supported by the UE in the UE capability information comprises:
receiving the frequency band of the MF mode supported by the UE in a Radio Frequency (RF) parameter contained in Evolved Universal Terrestrial Radio Access (E-UTRA) capability information of the UE capability information; and/or
receiving the function feature of the MF mode supported by the UE in a Function Group Indicator (FGI) parameter contained in the E-UTRA capability information of the UE capability information, the function feature of the MF mode comprising a measurement function feature and an intran intra handover function feature of the MF mode;
wherein the receiving the frequency band of the MF mode supported by the UE in the RF parameter contained in the E-UTRA capability information of the UE capability information comprises:
when a frequency band number used in the MF mode is same as a frequency band number used in a Licensed Assistant Access (LAA) mode, receiving the frequency band of the MF mode supported by the UE in the RF parameter contained in the E-UTRA capability information of the UE capability information using the frequency band number and a network type, the network type comprising the MF mode and/or the LAA mode; and
when a frequency band number used in the MF mode is different from a frequency band number used in the LAA mode, receiving the frequency band of the MF mode supported by the UE in the RF parameter contained in the E-UTRA capability information of the UE capability information using the frequency band number.

16. A base station, comprising:
a transmitter configured to transmit to a User Equipment (UE) a request message for acquiring a UE capability;
a receiver configured to receive UE capability information from the UE, the UE capability information comprising information indicating a capability of a MulteFire (MF) mode supported by the UE, the capability of the MF mode supported by the UE comprising a frequency band and/or a function feature of the MF mode supported by the UE; and
a processor configured to acquire the information indicating the capability of the MF mode supported by the UE from the UE capability information;
wherein the receiver is configured to indicate the frequency band of the MF mode supported by the UE in a Radio Frequency (RF) parameter contained in Evolved Universal Terrestrial Radio Access (E-UTRA) capability information of the UE capability information; and/or
the receiver is configured to indicate the function feature of the MF mode supported by the UE in a Function Group Indicator (FGI) parameter contained in the E-UTRA capability information of the UE capability information, the function feature of the MF mode comprising a measurement function feature and an intran intra handover function feature of the MF mode;

wherein when a frequency band number used in the MF mode is same as a frequency band number used in a Licensed Assistant Access (LAA) mode, the receiver is configured to indicate the frequency band of the MF mode supported by the UE in the RF parameter contained in the E-UTRA capability information of the UE capability information using the frequency band number and a network type, the network type comprising the MF mode and/or the LAA mode; and when a frequency band number used in the MF mode is different from a frequency band number used in the LAA mode, the receiver is configured to indicate the frequency band of the MF mode supported by the UE in the RF parameter contained in the E-UTRA capability information of the UE capability information using the frequency band number.

* * * * *